United States Patent
Matsuo et al.

(10) Patent No.: US 10,039,129 B2
(45) Date of Patent: Jul. 31, 2018

(54) WIRELESS DEVICE, WIRELESS COMMUNICATION METHOD AND WIRELESS COMMUNICATION SYSTEM

(71) Applicant: Kabushiki Kaisha Toshiba, Minato-ku (JP)

(72) Inventors: Ryoko Matsuo, Shinagawa (JP); Toshihisa Nabetani, Kawasaki (JP); Toshiyuki Nakanishi, Yokohama (JP); Hirokazu Tanaka, Bunkyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 131 days.

(21) Appl. No.: 15/165,378

(22) Filed: May 26, 2016

(65) Prior Publication Data

US 2016/0278126 A1    Sep. 22, 2016

Related U.S. Application Data

(63) Continuation of application No. PCT/JP2014/081765, filed on Dec. 1, 2014.

(30) Foreign Application Priority Data

Nov. 29, 2013 (JP) ................ 2013-248121

(51) Int. Cl.
*H04W 74/08* (2009.01)
*H04W 74/02* (2009.01)
(Continued)

(52) U.S. Cl.
CPC ... *H04W 74/0816* (2013.01); *H04W 72/0446* (2013.01); *H04W 72/1263* (2013.01);
(Continued)

(58) Field of Classification Search
None
See application file for complete search history.

(56) References Cited

U.S. PATENT DOCUMENTS

2008/0253328 A1  10/2008  Sahinoglu et al.
2011/0085522 A1*  4/2011  Park, II ............... H04W 74/02
                                                            370/336
(Continued)

FOREIGN PATENT DOCUMENTS

JP    2004-180207 A    6/2004
JP    2006-165806 A    6/2006
(Continued)

OTHER PUBLICATIONS

International Search Report dated Feb. 24, 2015 in PCT/JP2014/081765.
(Continued)

*Primary Examiner* — Kodzovi Acolatse
(74) *Attorney, Agent, or Firm* — Oblon, McClelland, Maier & Neustadt, L.L.P.

(57) ABSTRACT

A wireless device performs communication of a first access period and a second access period, the first access period including a plurality of slots in which communication is performed on a slot basis by allocating the slots and the second access period including a plurality of slots in which communication is performed in a contention-based access scheme on a slot basis, and includes a transmitter, a receiver and an control circuitry. The control circuitry performs, when one slot in the second access period is determined, carrier-sensing during a period of time depending on a type of the frame, and controls to transmit via the transmitter the frame at a timing defined depending on the type of the frame after the period of time.

20 Claims, 24 Drawing Sheets

(51) Int. Cl.
*H04W 72/04* (2009.01)
*H04W 72/12* (2009.01)
*H04J 3/16* (2006.01)

(52) U.S. Cl.
CPC ........... *H04W 74/02* (2013.01); *H04J 3/1694* (2013.01); *H04W 74/0808* (2013.01)

(56) References Cited

U.S. PATENT DOCUMENTS

| | | |
|---|---|---|
| 2012/0020336 A1 | 1/2012 | Bahr et al. |
| 2012/0134292 A1 | 5/2012 | Pandharipande et al. |
| 2013/0058222 A1* | 3/2013 | Ben-Yehezkel ....... H04L 12/413 370/242 |
| 2013/0272293 A1* | 10/2013 | Nguyen ................ H04W 74/02 370/347 |
| 2014/0226639 A1* | 8/2014 | Yi ........................ H04W 74/04 370/336 |
| 2014/0293976 A1* | 10/2014 | Huang .................. H04W 74/04 370/337 |
| 2015/0081201 A1* | 3/2015 | Rubin ...................... G08G 9/02 701/301 |

FOREIGN PATENT DOCUMENTS

| | | |
|---|---|---|
| JP | 2008-289135 A | 11/2008 |
| JP | 2012-515487 A | 7/2012 |
| JP | 2013-502796 A | 1/2013 |
| KR | 10-2008-0092773 A | 10/2008 |

OTHER PUBLICATIONS

"IEEE Standard for Local and metropolitan area networks—Part 15.4: Low-Rate Wireless Personal Area Networks (LR-WPANs)" IEEE Computer Sociaty, 802.15.4e™, 2012, pp. 1-209 and cover pages.

* cited by examiner

WIRELESS DEVICE, WIRELESS COMMUNICATION METHOD AND WIRELESS COMMUNICATION SYSTEM

CROSS REFERENCE TO RELATED APPLICATIONS

This application is a Continuation of International Application No. PCT/JP2014/081765, filed on Dec. 1, 2014, the entire contents of which is hereby incorporated by reference.

FIELD

Embodiments described herein relate to a wireless device, a wireless communication method and wireless communication system.

BACKGROUND

As one of access schemes, a TDMA (Time Division Multiple Access) scheme is known. In the TDMA scheme, a beacon signal is periodically broadcasted and a period between two beacon signals (i.e., beacon interval) is divided into a plurality of slots. Each slot is allocated to each terminal. In the TDMA scheme, the terminal receives the beacon signal and transmits/receives only at the previously allocated slot. Accordingly, there is an advantage that the signal of each terminal does not collide with the signals of other terminals in the node-self allocated slot. On the other hand, each terminal has not necessarily data to transmits/receives at the allocated slot each time. In that case, the allocated slot is not employed, resulting in that the channel use efficiency lowers. In order to prevent the channel use efficiency's lowering, there is a method to devise a slot allocation scheduling of the TDMA. However, the method involves complexity of the scheduling processing.

In order to resolve the problem, the following related method is proposed: in a case that the terminal does not start the use of the allocated slot until certain timing from a head of the allocated slot of the TDMA, other terminal(s) can use the allocated slot of the terminal by a contention-based access using carrier sensing. The proposed method is adopted in the international standard IEEE 802.15.4e.

However, the related method does not assume a communication scheme in which two kinds of periods of a TDMA scheme period and a contention-based access scheme period are employed. The contention-based access scheme period includes a plurality of slots in each of which each terminal transmits/receives on the contention-basis at a slot unit.

Even if the related method is simply applied for the TDMA scheme period of the two kinds of periods in the communication scheme, it is difficult to increase the channel use efficiency because the contention-based access scheme period is not considered. In a case that emergency data, which is data required to urgently transmit, is generated, it is required to immediately transmit the emergency data. Therefore, sufficiently increasing the channel use efficiency is necessary.

DETAILED DESCRIPTION

According to one embodiment, a wireless device includes a transmitter to transmit a first frame; a receiver to receive a second frame; and control circuitry to control communication of a first access period and a second access period, the first access period including a plurality of slots in which communication is performed on a slot basis by allocating the slots and a second access period including a plurality of slots in which communication is performed in a contention-based access scheme on a slot basis.

The control circuitry is configured to perform, when one slot in the second access period is determined for transmitting the first frame, carrier-sensing during a period of time defined depending on a type of the first frame, the period of time being a part of the one slot in the second access period, and control to transmit the first frame at a timing defined depending on the type of the first frame after the period of time according to a result of the carrier-sensing.

Hereinafter, embodiments of the present invention will be described with reference to the drawings.

First Embodiment

Figure 1:
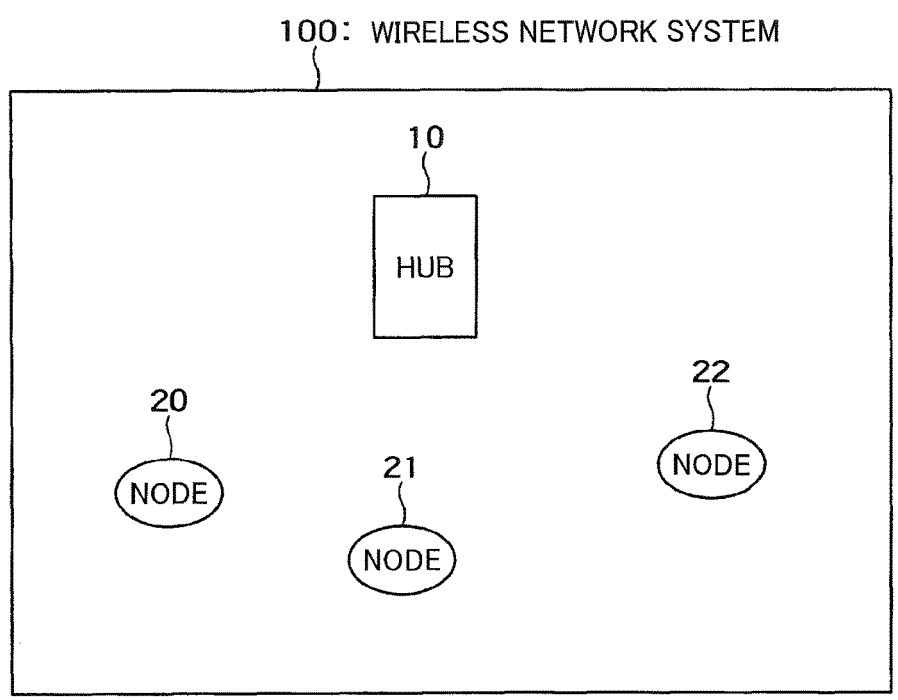
FIG. 1 is a view showing one example of a wireless network system according to a first embodiment.

FIG. 1 illustrates one example of a wireless network system relating to a first embodiment. A wireless network system 100 illustrated in FIG. 1 includes a hub 10 and a plurality of nodes 20, 21 and 22. The hub 10 includes a wireless communication device (or wireless device) that is operated as a center device. Each node includes a wireless communication device that is operated as a terminal of the center device. The wireless communication device of the hub 10 is an object communication device for the nodes 20, 21 and 22, and the wireless communication devices of the nodes 20, 21 and 22 are object communication devices for the hub 10.

Each node incorporates one or more sensors for example, and wirelessly transmits sensing information acquired by the sensor to the hub 10. Also, each node wirelessly receives control information or the like needed for communication from the hub. The system may be a network called a body area network which is a wireless network formed on a human body. In the body area network, the hub as a center device and the nodes as terminal devices are mounted on a human body, and communication between the hub and the nodes is performed. As the sensors on mounted on the nodes, a biosensor such as a sleep sensor, an acceleration sensor, an electrocardiogram sensor, a body temperature sensor and a pulse sensor is assumed. The communication network system according to the present embodiment may be an arbitrary network as long as a hub and nodes can be arranged and the hub operates as the center device. The present embodiment is not limited to the body area network.

FIG. 2A illustrates a timing chart of a node according to the first embodiment.

In an upper side of FIG. 2A, signals are shown which a receiver of the node receives from the hub, and in a lower side, signals are shown which a transmitter of the node transmits to the hub. A horizontal axis indicates a time axis and a right direction thereof along the drawing is a direction of time passage. Below, the communication scheme of the system according the present embodiment is summarily explained.

The system has an allocation-based access period, a contention-based access period, and an inactive period. In the allocation-based access period, which corresponds to TDMA (Time Division Multiple Access) period, each node is allocated to a slot(s) and communication is performed at a slot unit. In the contention-based access period, communication is performed in a contention-based access scheme such as a CSMA (Carrier Sense Multiple Access) scheme or a slot Aloha-based scheme. In the inactive period, no communication is performed. There may be no inactive period. The order of arrangement of these periods is not limited to those shown in the drawing. In the allocation-based access period and the contention-based access period, same frequency band (same channel) is employed, respectively.

The hub periodically transmits a beacon signal which is an announcement signal. Each node receives the beacon signal transmitted from the hub. In the drawing, vertically long rectangles with character "B" indicate reception of the beacon signals. The beacon signal is generically transmitted by broadcast but may be transmitted by multicast. An interval between successive two beacon signals is called a beacon interval. Within the beacon interval, the allocation-based access period, the contention-based access period, and the inactive period are arranged in this order. Within the beacon interval, same kind of periods may be arranged plural times via another kind of period. For example, the contention-based access period, the allocation-based access period, the contention-based access period may be arranged in this order.

The allocation-based access period includes a plurality of slots. Each node can be allocated one or plural different slots. Each node is not necessarily allocated the slot in every beacon interval and may be allocated the slot every a given number of beacon intervals. A use application may be set for the slot such as a slot at which a frame for retransmission is transmitted in a case of a failure of frame transmission. In a case that the node has a frame for transmitting to the hub (a data frame, a control frame, a management frame, etc.), the node can transmit the frame in a slot allocated to node-self (node-self allocated slot) or transmit the frame by use of the slot allocated to another node (see FIG. 2B as described later). When the hub successfully receives the data frame from the node, the hub transmits a response (Acknowledgement) frame. In the drawing, a vertically long rectangle with character "D" indicates a data frame and a vertically long rectangle with character "A" indicates a response frame.

The contention-based access period includes a plurality of slots. In each slot, communication is performed in any contention-based access scheme as a slot Aloha-based scheme or the CSMA-based scheme. In the present embodiment, the slot Aloha-based scheme is assumed. Generally, in the slot Aloha-based scheme, the node determines whether or not to transmit the frame at a predetermined probability by generating a random number when the node has the frame for transmission. When transmitting of the frame is determined, the node transmits the frame at a start timing of the slot. When no transmitting of the frame is determined, the transmission of the frame is skipped. A value of the predetermined probability can be changed as a parameter. In a case that a plurality of nodes simultaneously transmits the frames at the start timing of the slots, the signals of the frames collides with each other and the transmission by the nodes may fails at a high probability. In order to use the slot in the contention-based access period, unlike the allocation-based access period, each node is not required to be previously allocated the slot by the hub. The present embodiment is characterized in that a transmission timing(s) other than the start timing of the slot (which corresponds to a first timing) is set and the transmission timing to be used is controlled according to a type of a frame (see FIG. 2C as described later).

In order for each node to have the slot assigned by the hub in the allocation-based access period, each node transmits a connection request (C-Req) frame in the contention-based access period. Each node receives a connection assignment (C-Ass) frame (or a connection response frame) and is thereby allocated the slot. The situation in which the frames are transmitted and received is illustrated in FIG. 2A.

Figure 4A:
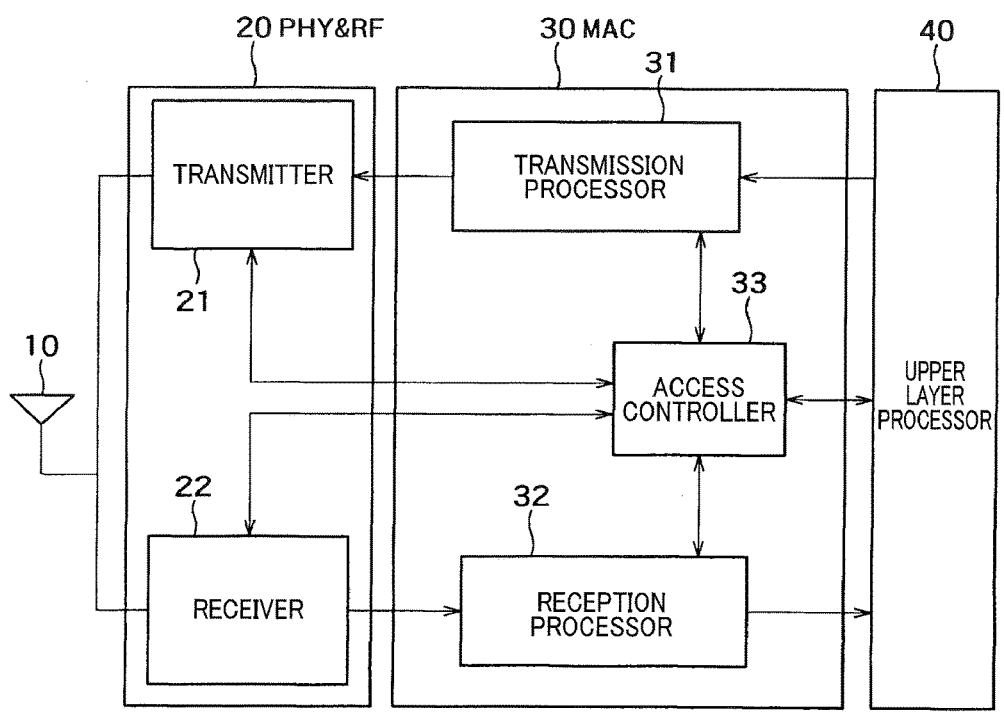
FIG. 4A is a block diagram of a wireless communication device which is a hub according to the first embodiment.

FIG. 4A shows a configuration example of the hub including the wireless communication device (or wireless device) according to the present embodiment. The wireless communication device includes an antenna 10, a PHY & RF unit 20, a MAC unit 30 that is a communication processing device or control circuitry according to the present embodiment, and an upper layer processor 40. The PHY & RF unit 20 includes a transmitter 21 and a receiver 22. The MAC unit 30 includes a transmission processor 31, a reception processor 32, an access controller 33, and a channel controller 34. The transmitter 21 and the receiver 22 form a communicator which communicates with the node. Alternatively, it is considerable that a transmission system and a reception system may corresponds the communicator, where the transmission system includes the transmitter 21 and the transmission processor 31 and the reception system includes the receiver 22 and the reception processor 32.

The access controller 33 manages an access of the channel of the frequency band in use, in each of the allocation-based access period, the contention-based access period and the inactive period. The access controller 33 controls to periodically transmit the beacon signal. Information on the allocation-based access period, the contention-based access period, the inactive period is notified to each node by the beacon signal. When the access controller 33 instructs the transmission processor 31 to transmit the beacon signal, the transmission processor 31 generate a beacon frame and outputs the beacon frame to the transmitter 21.

The transmitter 21 performs transmission at the channel of the frequency band in use. The receiver 22 performs reception at the channel of the frequency band in use. The transmitter 21 performs processing of a physical layer on the frame input from the transmission processor 31. The transmitter 21 performs D/A conversion and frequency conversion, etc. on the frame subjected to the processing of the physical layer to generate a transmission signal, and radiates the transmission signal as a radio wave into a space through the antenna 10.

The receiver 22 receives a signal through the antenna 10, performs reception processing on the received signal, and output the frame obtained by the reception processing to the reception processor 32. The reception processing includes, for example a frequency conversion to a baseband, and A/D conversion, analysis of a physical header of the frame subjected to the A/D conversion and demodulation processing, which correspond to processing of the physical layer.

The reception processor 32 performs analysis or the like of a MAC header of the frame input from the receiver 22. When the reception processor 32 receives the connection request frame from the node in the contention-based access period, the reception processor 32 notifies the connection request received from the node to the access controller 33. The access controller 33 determines allocation of the slot(s) based on the connection request and notifies a result of the determination to the transmission processor 31. The access controller 33 determines, for example, a number of slots to be allocated within the beacon interval, positions of the slots allocated, a period of a beacon interval at which the slot are allocated.

The transmission processor 31 generates the connection response frame according to the result of the determination notified from the access controller 33. In the case that the connection request frame notified from the node includes information on a sensor type of a sensor mounted in the node or information similar to the sensor type, the access controller 33 may extract the information and notify the information to the upper layer processor 40. The upper layer processor 40 may determine the number of slots to be allocated within the beacon interval and the period of the beacon intervals at which the slot are allocated, etc. based on the notified information. In this case, the upper layer processor 40 notifies the information such as the number of slots to be allocated as determined to the access controller 33. The access controller 33 performs slot allocation based on the notified information such as the number of slots to be allocated. Alternatively, if, in the transmission side of the connection request frame, a request on the number of slots to be allocated and a period of a beacon interval at which the slots are allocated is included in the connection request frame, information such as the number of slots to be allocated may be determined based on the request. The access controller 33 instructs the transmission processor 31 to generate the connection response frame including allocation information of slots. The transmission processor 31 generates the connection response frame and transmits it via the transmitter 21 at the channel in use.

When the reception processor 32 determines that the received frame is a data frame according to the analysis of the MAC header of the frame input from the receiver 22, the recession processor 32 outputs the frame to the upper layer processor 40 as necessary.

When there is downlink data to be individually transmitted to the node, the upper layer processor 40 passes a data frame including the data to the transmission processor 31. The access controller 33 instructs the transmission processor 31 to transmit the data frame to the node in a downlink slot acquired by an arbitrary method (for example, method using a beacon signal). The transmission processor 31 performs a MAC header addition process or the like on the frame and outputs the processed frame to the transmitter 21. The transmitter 21 transmits the frame input from the transmission processor 31 through the channel in use. Specifically, the transmission processor 31 performs the physical layer processing, such as modulation processing and physical header addition, to the frame. The transmission processor 31 performs D/A conversion or frequency conversion to the processed frame and radiates the signal as a radio wave to the space through the antenna 10.

Figure 4B:
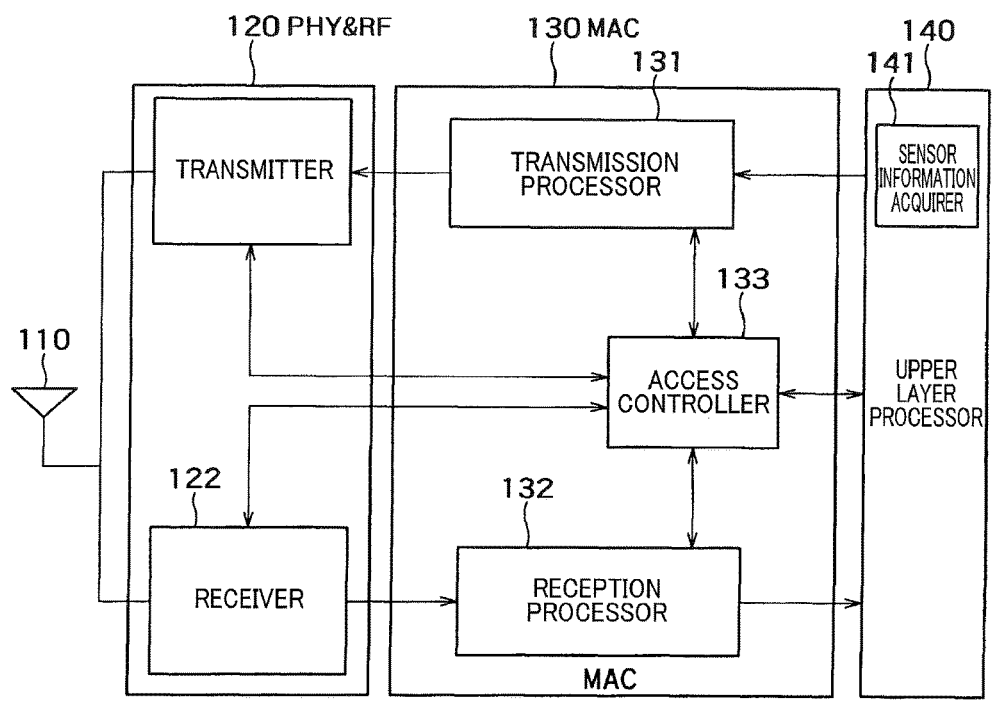
FIG. 4B is a block diagram of a wireless communication device which is a node according to the first embodiment.

FIG. 4B illustrates a block diagram of an example of configuration of the wireless communication device (or wireless device) as the node according to the present embodiment. The node includes an antenna 110, a PHY & RF unit 120, a MAC unit 130 that is a communication processing device or control circuitry according to the present embodiment, and an upper layer processor 140. The PHY & RF unit 120 includes a transmitter 121 and a receiver 122. The MAC unit 130 includes a transmission processor 131, a reception processor 132 and an access controller 133. The transmission processor 131 and reception processor 132 may include a transmission buffer and a reception buffer, respectively. The upper layer processor 140 includes a sensor information acquirer 141 which acquires the information of the sensor. The information of the sensor includes not only sensing information of the sensor but also information for specifying a state of the sensor and information on a sensing time. The transmitter 121 and the receiver 122 form a communicator which communicates with the hub. Alternatively, a transmission system and a reception system forms the communicator which communicates with the hub, where the transmission system includes the transmitter 121 and the transmission processor 131, and the reception system includes the receiver 122 and the reception processor 132.

The upper layer processor 140 outputs a transmission request for connection with the hub to the access controller 133 at predetermined timing, such as at the start or at the generation of transmission data. The upper layer processor 140 generates a frame including transmission data, such as sensing information, and outputs the frame to the transmission processor 131. Examples of the transmission data include sensing information acquired by a sensor such as a biological sensor, data indicating a result of processing of the sensing information by an application or the like, and data including a current state of the node. However, the transmission data is not limited to specific data. The upper layer processor 140 may include a data type of the transmission data in the transmission data frame. The data type may indicate a type of the sensor mounted in the node, or a degree of significance of sensing information. The degree of significance may be determined from a value of the sensing information. Alternatively, the data type may indicate a value of whether a state of the sensor is in failure or normal. The data type is employed to determine whether the transmission data frame is emergency data frame which is to be transmitted in highest priority as one example.

The upper layer processor 140 may be configured by a processor such as CPU, may be configured by hardware, or may be configured both of software and hardware. The upper layer processor 140 may perform processing of communication protocol of a more upper layer than MAC layer, such as TCP/IP or UDP/IP.

When the access controller 133 receives the transmission request from the upper layer processor 140, the access controller 133 issues a transmission instruction of the connection request frame to the transmission processor 131, and the transmission processor 131 outputs the connection request frame to the transmitter 121.

The transmitter 121 performs transmission at the channel of the frequency band in use. The receiver 122 performs reception at the channel of the frequency band in use. The receiver 122 receives the signal of the beacon frame transmitted from the hub at the channel.

The reception processor 132 performs analysis or the like of a MAC header of the frame input from the receiver 122. When the received frame is a connection response frame, the reception processor 132 notifies the connection response to the access controller 133.

The access controller 133 manages, based on information of each period included in the beacon signal received from the hub, the allocation-based access period, the contention-based access period and the inactive period. The access controller 133 controls the access in the allocation-based access period based on the allocation slot information included in the connection response frame.

The transmission processor 131 may perform cue management (QoS control) based on the data type of the frame input from the upper layer processor 140. When the transmission processor 131 receives the data frame from the upper layer processor 140, the transmission processor 131 outputs a transmission request for the data frame and the data type of the data frame to the access controller 133. The access controller 133 manages a state of the cue in the transmission processor 131 based on their information input from the transmission processor 131.

When the access controller 133 receives the transmission request for the data frame and the data type from the transmission processor 131, the access controller 133 determines based on the data type whether the data included in the data frame is emergency data which is required to transmit at a higher priority than data of other types. That is, the access controller 133 determines whether the data frame is the emergency data frame which is required to more preferentially transmit than data frames of the other data types.

In a case that the data type is a type of the sensor, whether the data is the emergency data is defined according to the type of the sensor. Alternatively, a table which associates types of a sensor with preference levels may be prepared. In this case, the preference level is specified based on the table, and the data frame having a highest preference level or a higher preference level than a predetermined value may be determined as the emergency data frame. Alternatively, in a case that the data type indicates a value of either failure or normal on the sensor, the emergency data frame may be determined when the data type indicates the failure.

The emergency data frame and other data frames may be managed in different cues. The access controller 133 may controls to preferentially transmit the emergency data and then transmit other data frames after the emergency data is transmitted.

The access controller 133 determines to transmit the emergency data frame at a highest priority. The access controller 133 determines a slot at which the emergency data frame can be transmitted at an earliest timing within the allocation-based access period or the contention-based access period according to a current time, as one example. Below, an operation by which the access controller 133 determines the period and the slot is described.

When a target slot is within the allocation-based access period, the access controller 133 performs carrier-sensing during a time interval from a head of the target slot until a first timing at which a predetermined time of period is elapsed, or during at least a part of the time interval, by using the receiver 22 wherein the target slot is a current slot when a current time is coincident with the head of the current slot, and a next slot when the current time is coincident with the head of the current slot. If the carrier is not detected, that is, a signal having a level higher than a predetermined level is not received, a result of the carrier-sensing is determined as being idle. In this case, the access controller 133 controls to transmit the emergency data frame from the first timing in the target slot. On the other hand, if the carrier is detected, that is, the result of the carrier-sensing is determined as being busy, similar processing is iterated until a slot at which the carrier is not detected is found, by targeting subsequent slots in order of arrangement thereof. In practice, in a case that a time to switch from reception of the signal of the carrier-sensing to transmission of a frame is required, the carrier-sensing may be ended the time required to switch before the first timing so that the frame transmission can start at the first timing. Hereinafter, for simplicity of explanation, the time required to switch is not considered. Definitely, if a slot at which an earliest transmission is possible is a slot allocated to the node-self within the allocation-based access period, the emergency data frame can be transmitted in the slot.

As shown in FIG. 2B, in the present embodiment, when the node transmits the frame in the self-allocated slot, the node starts transmission from a head of the slot. In FIG. 2B, the terms "slot owner" means the node which is allocated the slot (which may be called allocated-node). The term "others" means a node other than the allocated-node. The "slot owner" and "others" are examples of a type which indicates transmittable device. The node performs the carrier-sensing from a head of a slot which is not allocated to the node-self, to the first timing after the predetermined time of period, and if the carrier is not detected, the node can determined that the allocated-node does not perform transmission in the slot or the slot is not allocated to any node. The node can determine that the slot is an available slot. Accordingly, the node transmits the frame from the first timing in the available slot. In this way, the slot can be shared among the nodes.

On the other hand, when the target slot is within the contention-based access period, the node controls to transmit the data frame from a start timing of the target slot according to the contention-based access scheme (assumed that the slotted Aloha). As shown in FIG. 2C, within the contention-based access period, the emergency data frame is transmitted from a start timing of the slot. In FIG. 2C, the term "emergency" indicates an emergency data frame, and the term "others" indicates a frame other than the emergency data frame. The "emergency" and "others" indicates a type of a frame transmittable. In a case of transmitting the frame other than the emergency data frame, the node performs carrier-sensing from a start timing of the slot during a predetermined period of time, and if the carrier is not detected and thus transmission right is obtained, the node starts transmission of the frame according to the contention-based access scheme from the first timing after a predetermined period of time (the first timing may be same as or different from the first timing in a case of the allocation-based access scheme). In this way, the emergency data frame has a highest priority of transmission.

As stated above, within the contention-based access period, the emergency data frame is transmitted at the start timing of the slot. This means that in view of the slotted Aloha, a probability at which transmission is determined is fixedly determined as 1 (100%) without generating a random number and the emergency data frame is thus transmitted. As a modification example, the probability may be set to a high value less than 1 such as 0.9. In this case, the node generates a random number and determines transmission or non-transmission. Only when transmission is determined, the node transmits the emergency data frame. When retransmitting the emergency data frame, the probability may be set to a lower value than that at the first transmission. Thereby, it is possible to prevent that transmitted frames collide with each other among the nodes iteratively.

In a case that the contention-based access scheme is the CSMA scheme, the node may transmit the emergency data frame at the start timing of the slot without performing carrier-sensing (or with success of the carrier-sensing regarded). Alternatively, parameters such as a contention window and/or Back-off value in the CSMA may be adjusted to smaller values than those of other kinds of data. In a case that the emergency data frame is retransmitted, contention window/Back-off value may be gradually increased.

When the target slot is within the inactive period, the node waits until a next allocation-based access period comes. Detail of control for determining a slot at which transmission is made is described later by using the flow chart in FIG. 3.

In FIG. 4B, the transmission processor 131 reads out the emergency data frame from an internal buffer and performs processing of adding MAC header etc., under control by the access controller 133. The transmission processor 131 outputs the frame after the processing to the transmitter 121.

For the data frame not including emergency data, the access controller 133 determines a slot for transmitting the data frame in any method. For example, a slot which is not allocated to the node-self within the allocation-based access period, or a slot within the contention-based access period may be determined. In a case that earliest available slot is a slot which is allocated to the node-self within the allocation-based access period, the slot may be determined as the slot for transmitting the data frame. When the transmission is made at the slot which is not allocated to the node-self or the slot within the contention-based access period, carrier-sensing from a head of the slot to the first timing is performed and if the carrier is not detected, the access controller 133 controls to transmit the data frame.

The reception processor 132 performs processing on the MAC header or the like, for the frame input from the receiver 122.

When the reception processor 132 detects the received frame is a data frame as a result of analysis, the reception processor 132 outputs the frame after the processing the upper layer processor 140 as necessary.

The access controller 133 may internally hold the information necessary for various controls or may hold the information in an accessible storage not shown. For example, the status of the node, and the status of the hub, channel No., or the like may be held. Examples of the status of the node include information indicating whether the connection processing is executed and information of the remaining amount of battery. The status of the hub may include the information of the transmission timing of the beacon signal of the channel and ON/OFF state (i.e., Enable/Disable state) of the power of the hub or may include other information.

In FIG. 4B, transmission/reception of signals among the blocks related to the carrier-sensing is directly performed between the receiver 122 and the access controller 133, however, the transmission/reception may be performed via the reception processor 132.

Figure 3:
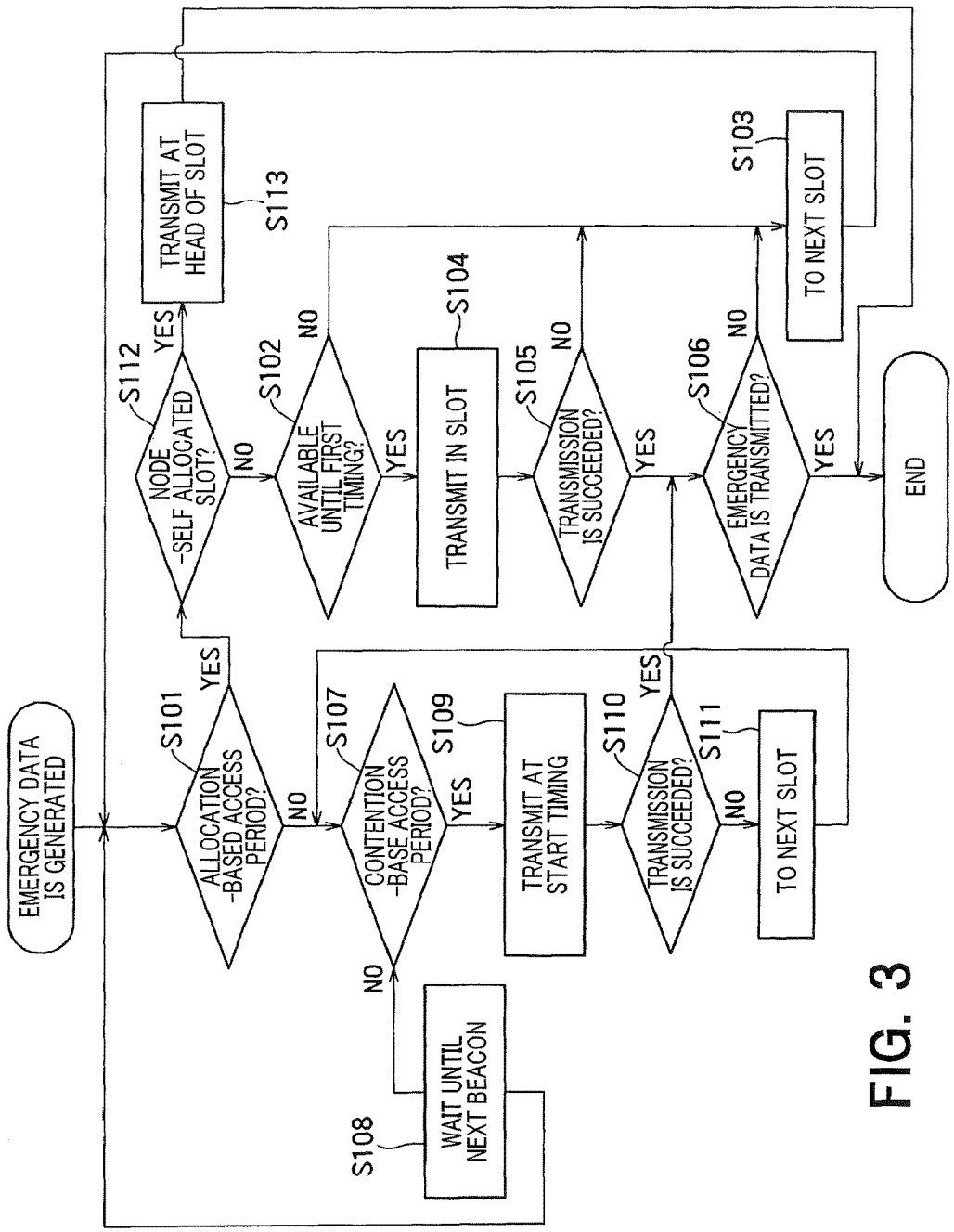
FIG. 3 is a flow chart of transmission processing by a node when emergency data is generated.

FIG. 3 is a flow chart of transmission processing performed when the emergency data generates.

The transmission processing of this flow chart starts to operate when the access controller 133 detects that the data frame input from the upper layer processor 140 is the emergency data frame.

When the access controller 133 detects the emergency data frame, the access controller 133 determines whether the target slot is within the allocation-based access period (where the target slot is a current slot if the current time coincides with a head of the current slot, and if not, a next slot) (S101). If the target slot is within the allocation-based access period, the access controller 133 determines whether the target slot is a slot allocated to the node-self (S112), and if it is the node-self allocated slot, the access controller 133 transmits the emergency data frame at the head of the slot (S113). IF it is not the self-allocated slot, the access controller 133 determines whether the target slot is available by performing carrier-sensing during a time interval from the head of the slot to the first timing in the slot or during at least a part of the time interval (S102). When the access controller 133 determines, as a result of carrier-sensing, that there is a received signal having a higher level than the predetermined level, that is, when the result of the carrier-sensing indicates busy, the access controller 133 determines that the slot is not available. In this case, the access controller 133 proceeds with the next slot (S103), and the flow returns to the step S101.

When the access controller 133 determines, as the result of the carrier-sensing, that there is no received signal having the higher level than the predetermined level, that is, when the result of the carrier-sensing indicates idle, the access controller determines that the slot is available. In this case, the access controller 133 controls to start transmission of the emergency data frame from the first timing in the slot (S104).

The access controller 133 determines whether the transmission of the emergency data frame at the step S104 succeeds (S105). For example, in a case of ACK scheme, succeed of the transmission is determined when an acknowledgement response frame is returned and a failure of the transmission is determined when the acknowledgement response frame is not returned. Another scheme such as NACK scheme other than the ACK scheme may be applied. When the access controller 133 determines the failure of the transmission, the access controller 133 proceeds with the next slot in order to retransmit the emergency data frame which has been unsuccessfully transmitted (S103). The flow returns to the step S101.

When the access controller 133 determines the success of the transmission of the emergency data frame, the access controller 133 determines whether all of the emergency data frames are transmitted (S106). When there is any emergency data frame which is not yet transmitted, the access controller 133 proceeds with the next slot (S103), and the flow returns to the step S101.

Figure 2:
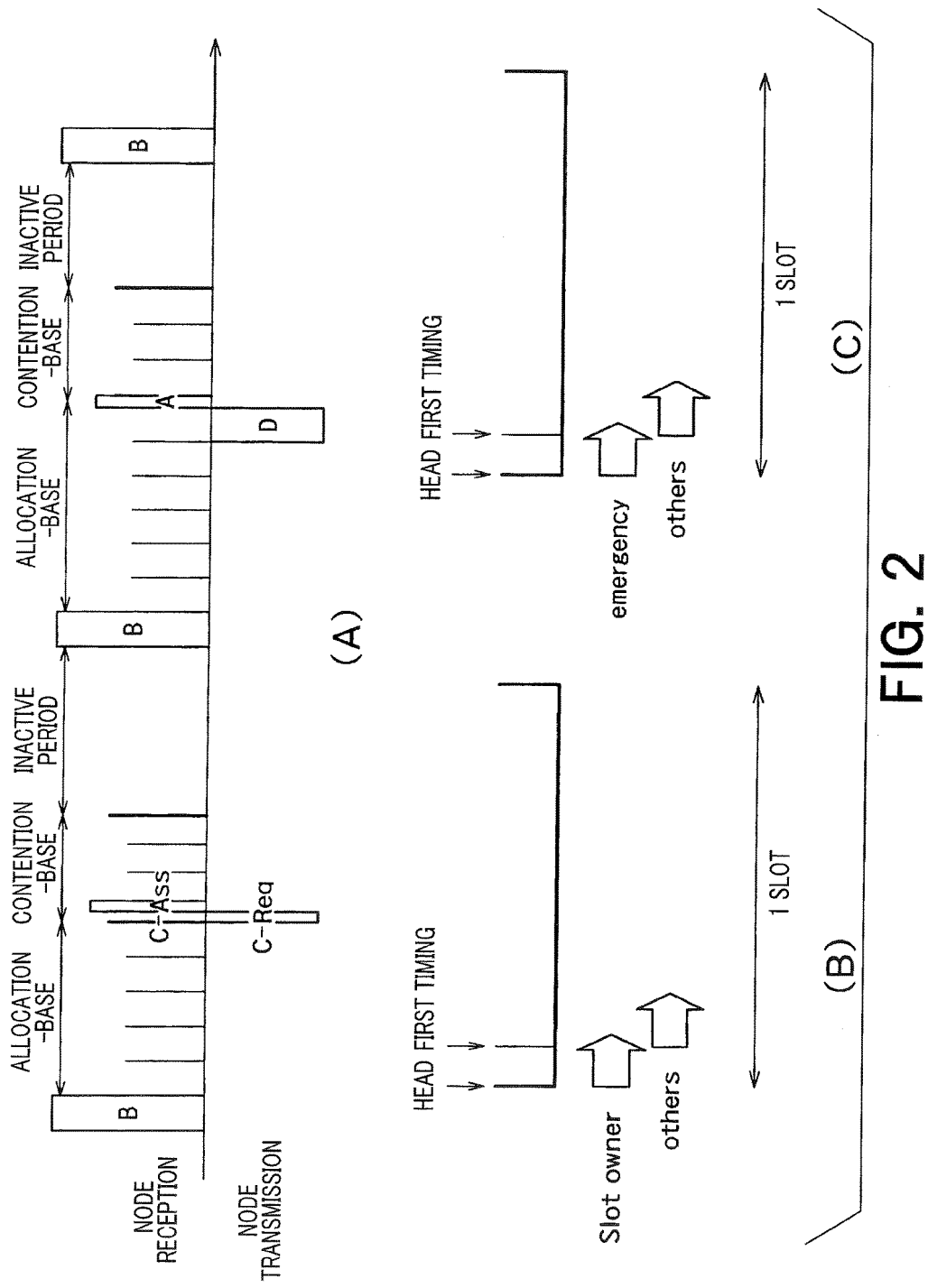
FIG. 2 is a timing chart of a node according to the first embodiment.

When the access controller 133 determines that the target slot is not within the allocation-based access period at the step S101, the access controller 133 determines that the target slot is within the contention-based access period (S107). When the access controller 133 determines that the target slot is not within the contention-based access period, that is, the target is within the inactive period, the access controller 133 waits until a next beacon signal is received (S108), and the flow returns to the step S101. This is because, as illustrated in FIG. 2, after the inactive period, the allocation-based access period and/or the contention-based access period exist within same beacon interval. However, in a case of a scheme in which after the inactive period, the allocation-based access period and/or the contention-based access period is arranged within the same beacon interval, the access controller 133 may wait until the allocation-based access period or the contention-based access period start, and such modification is possible. In the present explanation, assumed that after the beacon signal, the allocation-based access period and then the contention-based access period are arranged, in even a system in which a sequence of the allocation-based access period and the contention-based access period is reversed, the similar determination is possible.

In step S107, when the access controller 133 determines that the target slot is within the contention-based access period, the access controller 133 transmits the emergency data frame at the start timing of the target slot (S109).

The access controller 133 determines whether the emergency data frame is successfully transmitted (S110). For example, in a case of the ACK scheme, succeed of the transmission is determined when an acknowledgement response frame is returned, and a failure of the transmission is determined when the acknowledgement response frame is not returned. Another scheme such as NACK scheme other than the ACK scheme may be applied. When the access controller 133 determines the success of the transmission, the access controller 133 determines whether all of the emergency data frames are transmitted (S106). The processing after the step S106 is described above.

When the access controller 133 determines the failure of the emergency data frame, the access controller 133 proceeds with the next slot (S111), and determines whether the slot is within the contention-based access period (S107). The processing after the step S107 is described above. A frame which is unsuccessfully transmitted first and transmitted second time or subsequent time corresponds to a retransmitted frame. As stated above, according to the first embodiment, the terminal which is allocated the slot has a highest priority of the slot within the allocation-based access period. Another node can use the slot when the allocated node does not use the slot. Within the contention-based access period, the node can preferentially transmit the emergency data by giving priority on the emergency data. Therefore, effective utilization of the slot by another node other than the allocated node in TDMA and early transmission of the emergency data can be both realized.

Second Embodiment

In the first embodiment, for each slot in the allocation-based access period, two timing of a start timing thereof and a first timing are set. Also, for each slot in the contention-based access period, two timing of a start timing thereof and a first timing are set. In the second embodiment, three transmission timings are set for each slot in each period and thereby transmission timing is finely controlled.

FIG. 5A shows a timing chart of a node according to the second embodiment. FIG. 5B shows three transmission timings set for a slot within the allocation-based access period. FIG. 5C shows three transmission timings set for a slot within the contention-based access period. Explanation on similar operations to those of FIG. 2 is omitted.

As shown in FIG. 5B, within the allocation-based access period, priorities are set in order of (1) the allocated node, (2) a node having the emergency data frame to be transmitted other than the allocated node, and (3) a node having other type of frame to be transmitted other than the emergency data frame except the allocated node. The term "Slot owner" corresponds to a type of a transmittable device, and the terms "emergency" and "others" correspond to a type of a transmittable device and/or a type of frame.

As shown in FIG. 5C, within the contention-based access period, priorities are set in order of (1) emergency data frame, (2) control frame or management frame (C/M frames), (3) other data frame than the emergency data frame. The terms "emergency", "C/M frames" and "others" corresponds to types of a transmittable frame.

In FIG. 5C, "C/M frames" means a control frame or a management frame. Examples of the control frame include a response frame such as ACK frame, a poll frame, and a wakeup frame. Examples of the management frame include frames employed for connection processing such as a connection request frame, connection assignment frame. The present embodiment, the control frame and the management frame are assumed to be transmitted within the contention-based access period.

In FIG. 5A, case 1, case 2 and case 3 are illustrated. In case 1, a node has a transmission request of the emergency data generated within the allocation-based access period. In case 2 subsequent to case 1, within the contention-based access period, the node has a transmission request of the emergency data generated. In case 3 subsequent to case 2, the node has a transmission request of the management frame generated within the same contention-based access period.

Figure 5:
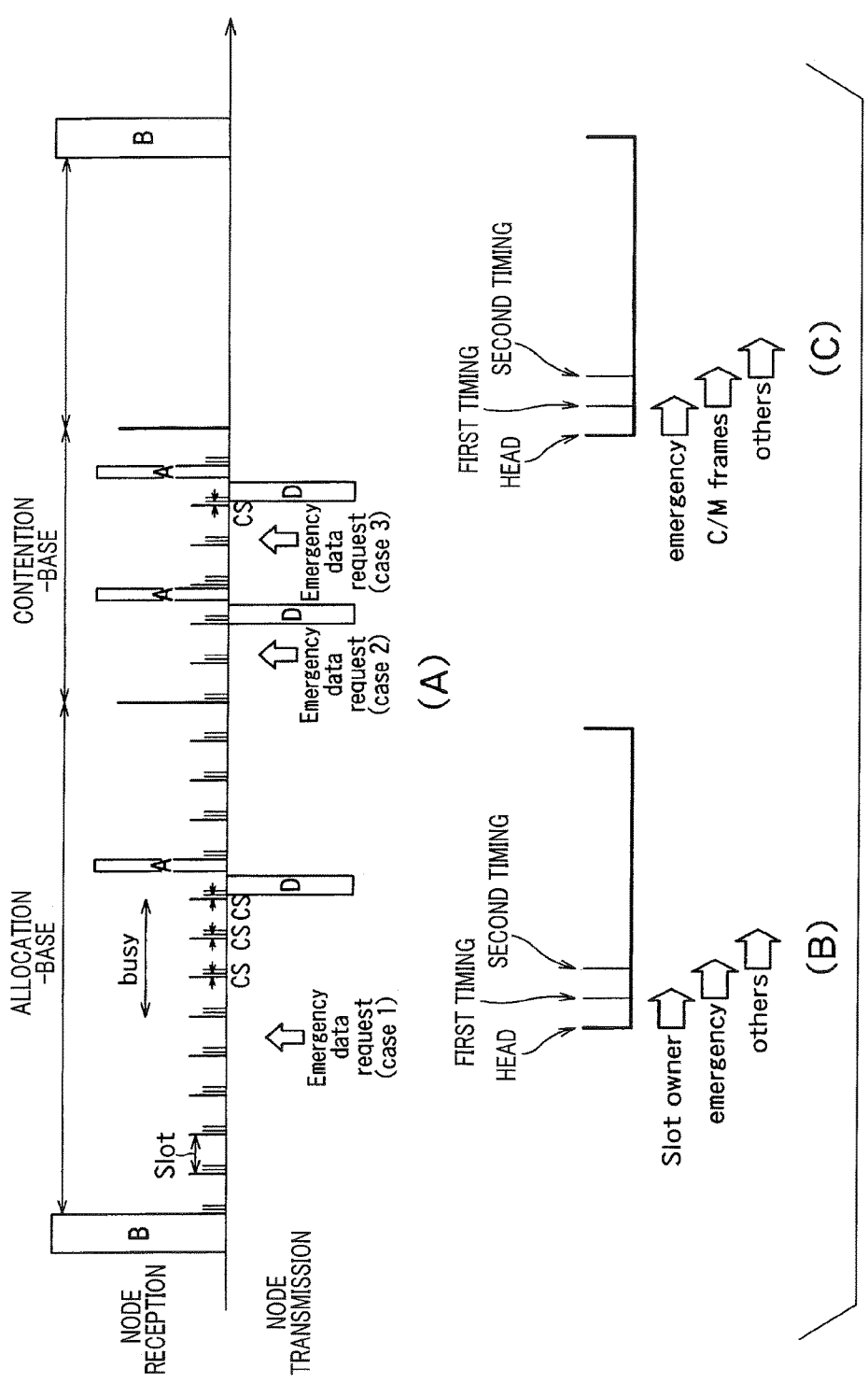
FIG. 5 is a timing chart of a node according to a second embodiment.

Case 1 is first explained in which within the allocation-based access period, the transmission request of the emergency data is generated. From a head of a target slot to the first timing (see FIG. 5B), the node performs carrier-sensing. In the example (case 1) of FIG. 5, in three slots arranged after the slot in which the transmission request of the emergency data is generated, results of the carrier-sensing indicates busy (i.e., the carrier is detected). This is because the three slots are allocated to other nodes and the other nodes transmit frames in the three slots, respectively. In fourth slot, a result of the carrier-sensing indicates idle (i.e., the carrier is not detected). Therefore, at the first timing after a predetermined period of time from the head of the fourth slot, the emergency data frame starts to be transmitted. In a case of transmitting other frame than the emergency data frame, the carrier-sensing is performed during a time interval from the head of the fourth slot to the second timing (FIG. 5B) which is arranged after the first timing, or during at least a part of the time interval. If a result of the carrier-sensing indicates idle, the frame is transmitted (FIG. 5B). A time interval in which the carrier-sensing is performed may be a time interval from the first timing to the second timing or a part of the time interval.

Subsequently, case 2 is explained in which within the contention-based access period, the transmission request of the emergency data is generated. In a case of transmitting the emergency data frame in a slot within the contention-based access period, a start timing (i.e., head) of the slot is transmission timing of the emergency data frame (FIG. 5C).

Accordingly, the node starts to transmit the emergency data frame at the head of the target slot. In a case that the contention-based access scheme is slotted Aloha, transmission is performed depending on a predetermined transmission probability as stated above. Here, the predetermined transmission probability is set to 1, which means absolutely transmission. In a case of retransmission of the emergency data frame, the predetermined transmission probability may a value less than 1. More the number of retransmission increases, smaller the predetermined transmission probability may be made.

Subsequently, case 3 is explained in which within the contention-based access period, the transmission request of the management frame generates. An operation performed when the transmission request of the control frame is same as that of case 3. A transmission timing of the management frame is the first timing which is timing after a predetermined period of time elapse from the head of the slot (FIG. 5C). The carrier-sensing is performed from the head of the target slot to the first timing, and if a result of the carrier-sensing indicates idle, the node determines that the available slot is found and transmits the management frame from the first timing in the slot (FIG. 5C). Assumed that the predetermined transmission probability is set to 1, however, a smaller value than 1 may be set.

In a case of transmitting a data frame other than the emergency data frame (the data frame definitely does not include a management frame or a control frame), the carrier-sensing is performed during a time interval from the head of the slot to the second timing arranged after the first timing or during at least a part of the time interval, and if a result of the carrier-sensing indicates idle, the node transmits the data frame (FIG. 5C). A time interval in which the carrier-sensing is performed may be a time interval from the first timing to the second timing or a part of the time interval. The second timing used in the contention-based access period is same as or different from the second timing used in the allocation-based access period.

Figure 6:
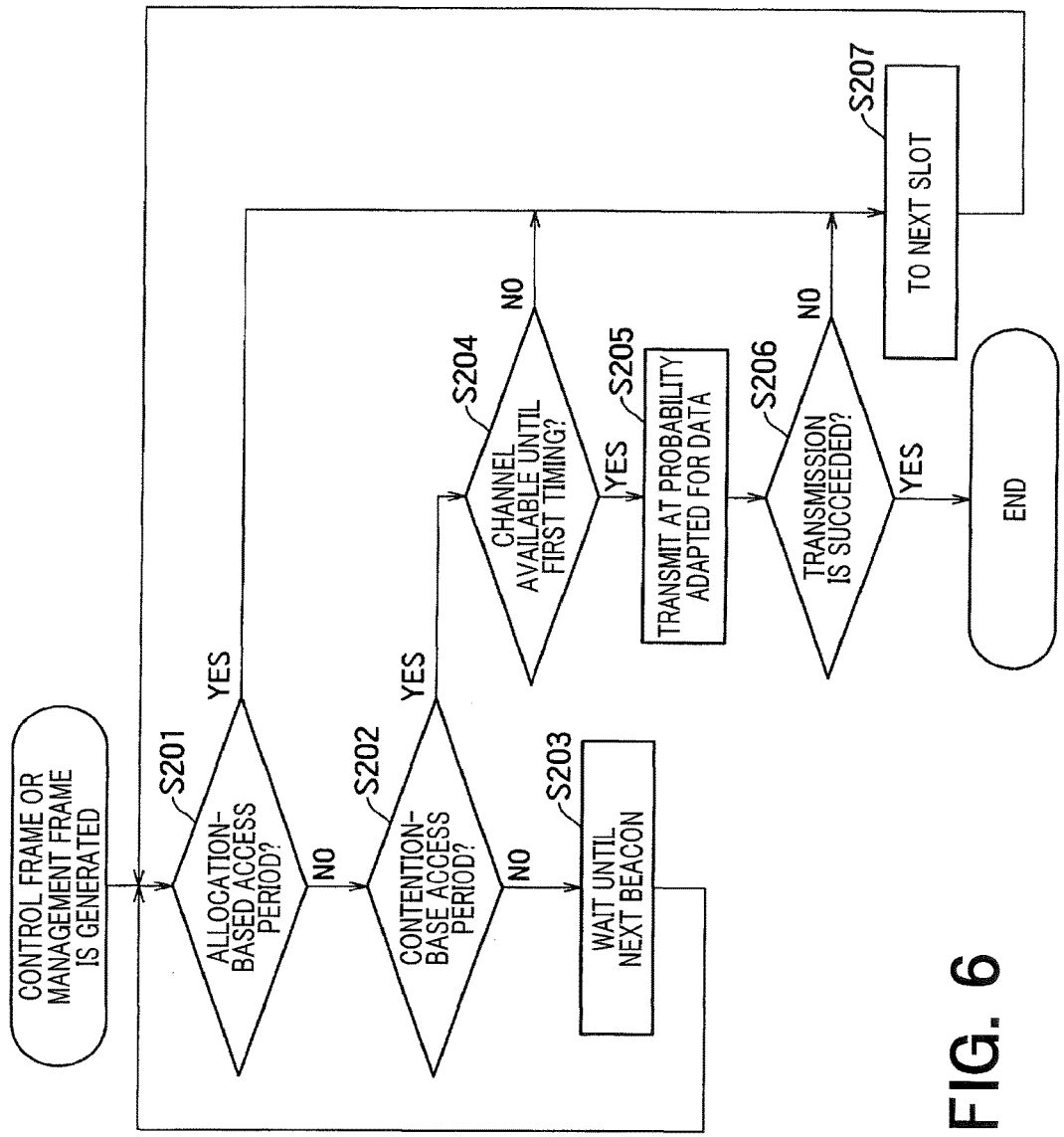
FIG. 6 is a flow chart of a node according to the second embodiment when a transmission request of a control frame or a management frame is generated.

FIG. 6 shows a flow chart of processing performed when the transmission request of the control frame or the management frame is generated in a node. The access controller 133 of the node determines whether the target slot is within the allocation-based access period (S201). The target slot is a current slot if a start time of the processing of the flow coincides with the head of the current slot, and on the other hand, if the start time of the processing of the flow is underway or an end of the current slot, the target slot is the next slot. When the target slot is within the allocation-based access period, the processing proceeds with the next slot (S207) and returns to the step S201. In the step S201, handling the next slot as the target slot, the similar judgment to the above is made.

When the target slot is not within the allocation-based access period, the node determines whether the target slot is within the contention-based access period (S202). When the target slot is not within the contention-based access period, that is, when the target is within the inactive period, the node waits until the next beacon signal is received (S203). When the node receives the beacon signal, the processing on or after the step S201 are performed.

When the target slot is within the contention-based access period, the carrier-sensing is performed from the start timing of the target slot to the first timing (S204).

When a result of the carrier-sensing indicates idle, that is, when the target slot is an available slot, the node transmits the control frame or the management frame according to the predetermined transmission probability (S205). Assumed that the predetermined transmission probability is 1, however, a smaller value than 1 may be set. In a case of retransmission of the frame, the predetermined transmission probability is made smaller than that at first transmission of the frame.

The node determines whether the control frame or the management frame is successfully transmitted (S206), and if the transmission succeeds, the processing ends. If the transmission fails, the processing proceeds for the next slot (S207). By handling the next slot as the target slot, processing on or subsequent to the step 201 is performed.

Figure 7:
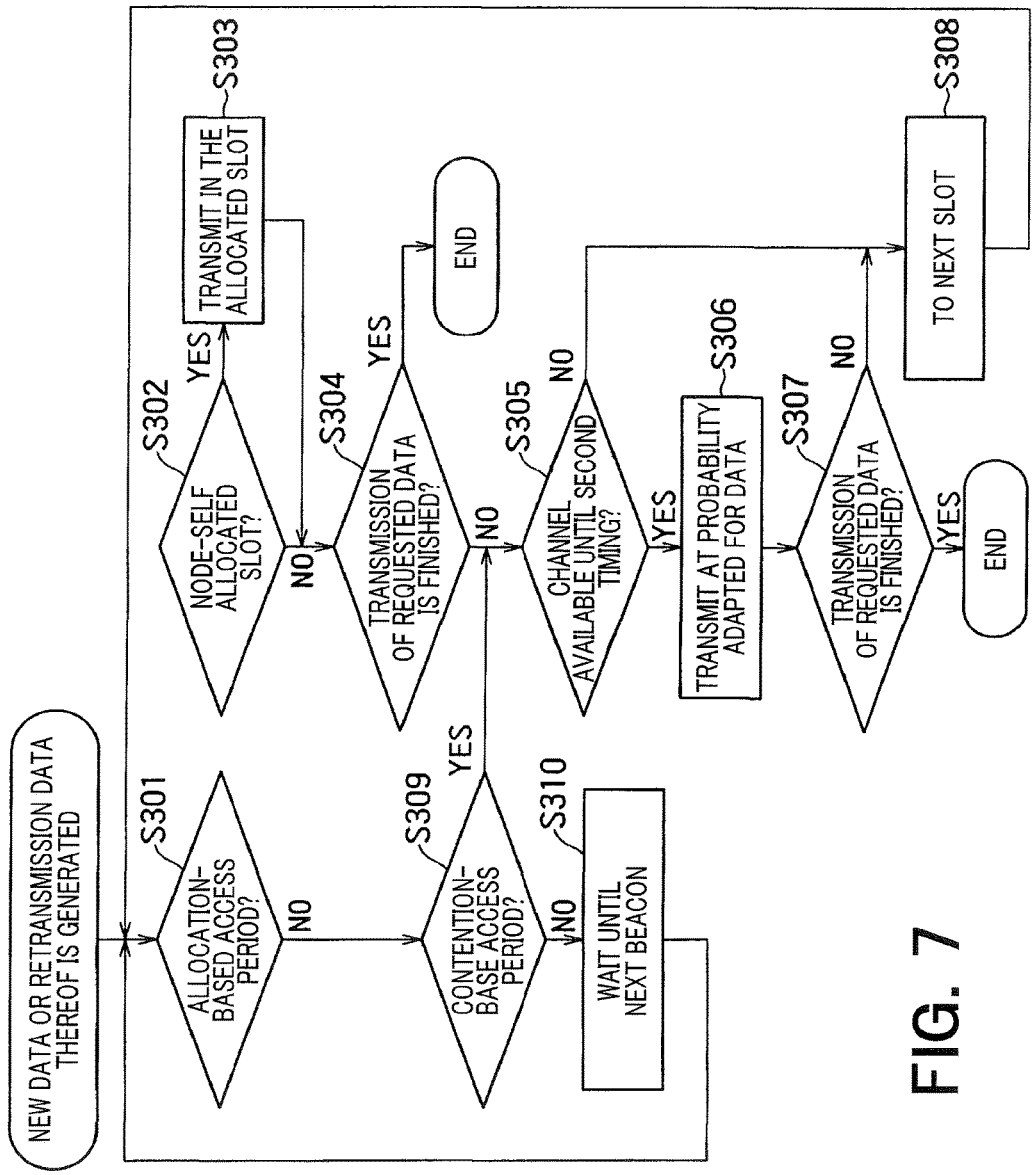
FIG. 7 is a flow chart of processing according to the second embodiment when ordinary data other than emergency data is generated.

FIG. 7 shows a flow chart of processing performed when a transmission request of a data frame including ordinary data other than the emergency data is generated. The ordinary data is, for example, data to be newly transmitted such as sensor data or retransmission data thereof.

The access controller 133 of the node determines whether the target slot is within the allocation-based access period (S301). The target slot is a current slot if a start time of the processing of the flow coincides with the head of the current slot, and on the other hand, if the start time of the processing of the flow is underway or an end of the current slot, the target slot is the next slot. When the target slot is within the allocation-based access period, the access controller 133 determines whether the target slot is a slot allocated to the node-self (S302). When the target slot is the slot allocated to the node-self, access controller 133 transmits the data frame at the start timing of the target slot (S303). The access controller 133 determines whether all of the data frames including ordinary data are transmitted (S304). When the transmission completes, the processing ends.

When the target slot is not the slot allocated to the node-self, or there is a frame including ordinary data which is not yet transmitted, the node performs carrier-sensing from the start timing of the target slot to the second timing and determines whether a result of the carrier-sensing indicate idle (S305). When the result of the carrier-sensing indicates idle, the access controller 133 controls to transmit the data frame according to the predetermined transmission probability (S306). The predetermined transmission probability may be 1 or a smaller value than 1. In a case of retransmission, the predetermined transmission probability is made smaller than that at first transmission.

The access controller 133 determines whether all of the data frames including ordinary data are successfully transmitted (S307). If all of the data frames are successfully transmitted, the processing ends. If there is a remainder of the data frames which are not yet successfully transmitted, the processing proceeds to the next slot (S308). By handling the next slot as the target slot, processing on or subsequent to the step S301 are performed.

At the step S301, when the access controller 133 determines that the target slot is not within the allocation-based access period, the access controller 133 determines whether the target slot is within the contention-based access period (S309). When the target slot is within the contention-based access period, the processing proceeds to the step S305, and operation as stated above are performed.

When the target slot is not within the contention-based access period, that is, when the target slot is within the inactive period, the node waits until a next beacon signal is received (S310). When the node receives the beacon signal, the processing on or subsequent to the step 301 are performed.

For retransmission of ordinary data other than emergency data, it is considerable that a slot is allocated within an allowed delay period of time of data frame to be transmitted. However, in a casing of allocating the slot for retransmission, many slots are required to be allocated within the allowed delay period of time of data frame to be transmitted. This results in redundantly slot allocation. Therefore, the slot allocation for retransmission is not performed and a shared slot may be used retransmitting data other than the emergency data. The shared slot is a slot which is not allocated to the node-self within the allocation-based access period or a slot within the contention-based access period. That is, the slot allocation is not performed for retransmission, or the number of times of retransmission is limited. For example, for retransmission or two or more times of retransmission, the shared slot is used. In this way, redundancy of the scheduling is reduced and therefore, the scheduling is advantageously made simple and effective.

As shown in FIG. 5B and FIG. 5C, priorities of transmission timing in each slot within the allocation-based access period and the contention-based access period are one example, and other examples are possible.

Figure 8:
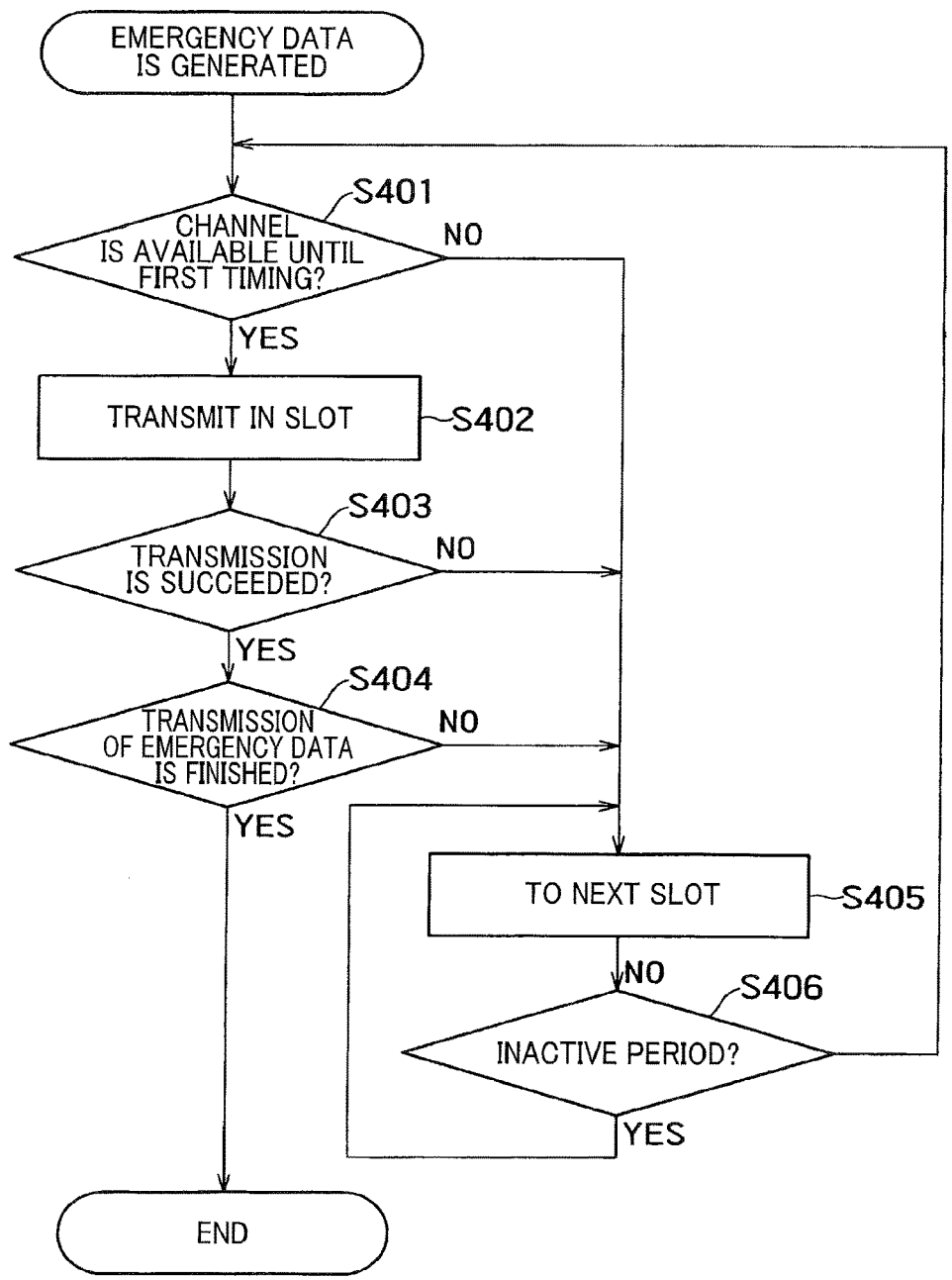
FIG. 8 is a flow chart according to the second embodiment in which a flow of determining whether a current period is an allocation-based access period or a contention-based access period is omitted.

In the example of FIG. 5C, regarding to the priority in the contention-based access period, the emergency data frame is assigned to the start timing of the slot, a control frame or a management frame is assigned to the first timing, and other data frames are assigned to the second timing. As a modification example thereof, the control frame or the management frame may be assigned the start timing of the slot, the emergency data frame may be assigned the first timing, and other data frames may be assigned the second timing. In this example, in either period of the allocation-based access period or the contention-based access period, the transmission timing of the emergency data frame is the first timing. Therefore, determination processing for discriminating the allocation-based access period and the contention-based access period is not required. The processing flow in such case is shown in FIG. 8. Compared with the processing flow of FIG. 3, the processing is made simplified. Below, the flow of the processing of FIG. 8 is explained.

The access controller 133 of the node performs carrier-sensing from the start timing of the target slot to the first timing and determines whether a result of the carrier-sensing indicates idle (S401).

When the result of the carrier-sensing indicates idle, the access controller 133 controls to transmit the emergency data frame from the first timing in the target slot (S402). The access controller 133 determines whether the transmission succeeds (S403), and if the transmission succeeds, then determines whether all of the emergency data frames are successfully transmitted (S404). If all of the emergency data frames are successfully transmitted, the processing ends.

When the result of the carrier-sensing indicates busy at the step S401, when the transmission fails at the step S403, or when the node determines that there is the emergency data frame which is not yet transmitted at the step S404, the processing proceeds to the next slot (S405). When the next slot is within the inactive period, the node waits until the inactive period elapses (S406). Returning to the step S401, by handling a first slot within the allocation-based access period as the target slot, similar processing is iterated.

As stated above, according to the second embodiment, three stages of transmission timing are set in each slot of the allocation-based access period and one of them is dedicated to the emergency data frame. Thereby, in the allocation-based access period, transmission of the emergency data frame can be succeeded at high probability. Also, the control frame or the management frame can be succeeded at high probability because the transmission timing for the control frame or the management frame is set in a dedicated manner in each slot of the contention-based access period, distinctly from the transmission timing of the data frame including ordinary data.

Third Embodiment

In the first and second embodiments, the method has been explained in which, when the transmission request of the emergency data is generated, performs transmission processing of the emergency data rapidly as possible. For the purpose of the rapid transmission, for example, there was a case in which in the allocation-based access period, the emergency data frame is transmitted in a slot not allocated to the node-self. In the case, the carrier-sensing are required from the starting timing of the slot to the first timing.

Assumed a system in which the beacon interval is about several ms (micro second) to several 100 ms. As one example, the beacon interval is 100 ms and the allocation-based access period in the beacon interval is about 70 ms. In this case, when the transmission request of the emergency data is generated at the beacon timing, the time length required to wait for performing transmission of the emergency data frame until the contention-based access period comes is about 70 ms. Regarding that the delay from the generation of the transmission request of the emergency data to the transmission of the emergency data frame is about 70 ms, it may be of no matter according to circumstances. In this case, by waiting for the contention-based access period and performing transmission at the start timing of the slot therein, the carrier-sensing is not required (in a case of first embodiment or the second embodiment of FIG. 5C). Compared with the case of performing the carrier-sensing in the slot in the allocation-based access period, the above method enables to reduce power consumption of the carrier-sensing processing. If the node attempts to performs the transmission at the slot not allocated to the node-self in the allocation-based access period, the carrier-sensing is required and, if a result of the carrier-sensing indicates busy, carrier-sensing of several slots may be required according to circumstances. Therefore, by performing transmission at the start timing of the slot in the contention-based access period, power consumption required for the carrier-sensing processing can be reduced.

In the third embodiment, a method is explained in which according to the generation timing of the transmission request of the emergency data or an emergency level (or priority) of the emergency data, determines either to omit the carrier-sensing by using the slot in the contention-based access period as possible or perform transmission in allocation-based access period regardless of the reduction of the power consumption.

Figure 9:
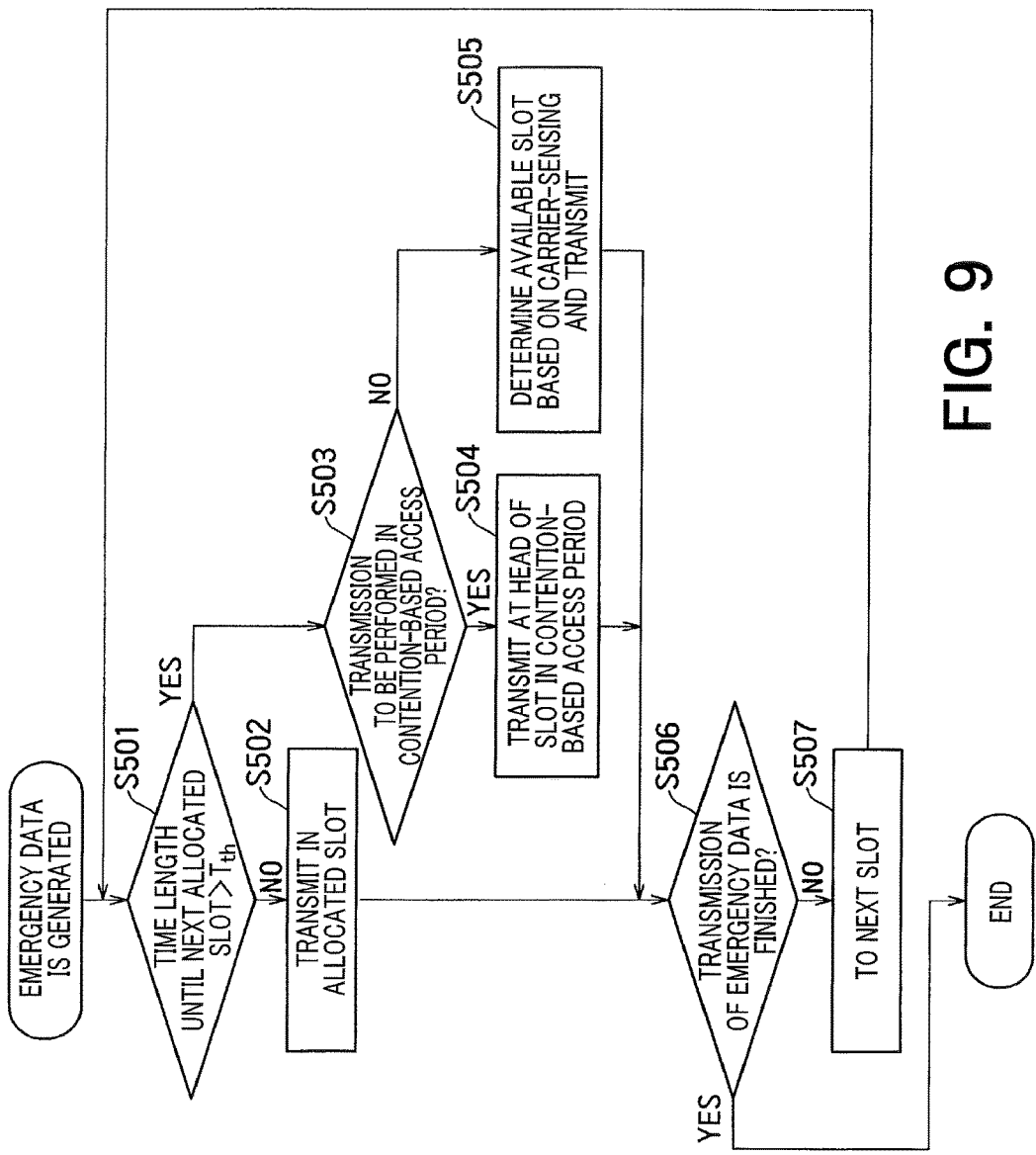
FIG. 9 is a flow chart of determination processing of a transmission slot according to a third embodiment when a transmission request of emergency data is generated.

FIG. 9 shows a flow chart of determination processing of a slot used for transmission (which may be called a transmission slot) when the transmission request of the emergency data is generated according to the present embodiment. In the determination flow, assumed that, in the first and second embodiments, the emergency data frame is associated with the start timing of the slot in the contention-based access period.

When the transmission request of the emergency data is generated, the access controller 133 calculates a time length from a current time or a current slot to a start of the node-self allocated slot and compares the time length with threshold Tth (S501). If the time length is less that the threshold Tth or equal to, the access controller 133 controls to transmit the emergency data frame by the node-self allocated slot (S502). That is, if the delay is small to wait for the node-self allocated slot and perform transmission, the node performs transmission at the node-self allocated slot. This increases a probability at which the emergency data frame is successfully transmitted by preventing colliding with transmission of other nodes. If the is any emergency data frame which is not yet transmitted (NO in S506), the processing proceeds to the next slot (S507) and then returns to step S501. When all of the emergency data frame are transmitted (YES in S506), the processing ends.

The threshold Tth may be set in a plural stages according to the emergency level (priority) of the emergency data. Higher the emergency level is, smaller the threshold Tth is made. The emergency level may be determined by the upper layer processor 140 and notified to the access controller 133 together with the emergency data frame. Alternatively, the access controller 133 may determine the emergency level based on the type of the emergency data.

In step S501, if the time length to the node-self allocated slot larger than the threshold Tth, the node determines to perform either transmission in the contention-based access period or transmission in the allocation-based access period (S503).

For a simple method, the node determines to perform the transmission in the current slot (target slot), regardless that the target slot is within either the contention-based access period or the contention-based access period.

Alternatively, when the target slot is within the allocation-based access period although the time length to the contention-based access period is less that a predetermined threshold (which may be different from the threshold Tth) or equal to, the node determines to wait until the contention-based access period comes and perform transmission at the start timing of a head slot in the contention-based access period. Depending on a system, a case is assumed that the node cannot implement the contention-based access period on the grounds that a slot(s) therein are assigned to the hub for the purpose of transmission of downlink data from the hub or notification of slot allocation change information etc. In that case, the assumption is made that the slot(s) is not used. For example, when slot No. and the number of slots allocated to the hub previously for the downlink data and the slot allocation change information are notified by the beacon signal, the node considers the notified information and does not perform transmission in the hub allocated slot(s) in the contention-based access period. The node may measure a channel utilization ratio of each slot in the contention-based access period in each beacon interval every one or a plurality of beacon intervals. The node may then determine to not use the slot having the channel utilization ratio higher than a predetermined value based on the measuring result.

When the node determines to perform the transmission in the contention-based access period, the node transmits the emergency data frame from the start timing of the slot without performing the carrier-sensing (S504). When all of the emergency data frames are transmitted (YES in S506), the processing ends. When the transmission fails or there is any emergency data frame which is not yet transmitted (NO in S506), the processing proceeds to the next slot (S507) and then returns to step S501. When all the emergency data frames are transmitted (NO in S506), the processing ends.

When the node determines to perform the transmission in the allocation-based access period, the node performs the carrier-sensing from the start timing of the slot to the first timing and if a result of the carrier-sensing indicate idle, the node transmits the emergency data frame from the first timing (S505). When the result of the carrier-sensing indicates busy, the transmission fails or all of the emergency data frames are not yet transmitted (NO in S506), the processing proceeds to the next slot (S507) and then returns to step S501. When all of the emergency data are transmitted (YES in S506), the processing ends. The node may measure a channel utilization ratio of each slot in the allocation-based access period in each beacon interval every one or a plurality of beacon intervals. The node may then determine to not use the slot having the channel utilization ratio higher than a predetermined value based on the measuring result. As stated above, according to the present embodiment, by determining the transmission slot based on the time length to the node-self allocated slot, the emergency level of the emergency data, the time length to the contention-based access period or other criterion for determination, carrier-sensing can be omitted as possible.

Fourth Embodiment

In the first and second embodiments, a method is proposed in which two or three stages of transmission timings are set and for each transmission, a transmittable device or a type of a transmittable frame is set.

In order for such method to be applied for an actual system, setting information (slot sharing information) relating to a transmission timing are required to be shared between the hub and a plurality of nodes connected to the hub. In the fourth embodiment, the method to share the slot sharing information is proposed.

As the method to share the slot sharing information between the hub and the nodes, there is a method which previously defines it as specification of the system, for example.

As another example, there is a method in which the hub sets the slot sharing information and transmits the beacon signal including the information to nodes by broadcast. Thereby, the slot sharing information may be also shared between the hub and all nodes. The slot sharing information may be included in a frame other than the beacon signal. For example, a method is possible in which the slot sharing information is included in a connection response frame etc. returned from the hub responding to a connection request from the node.

Figure 10:
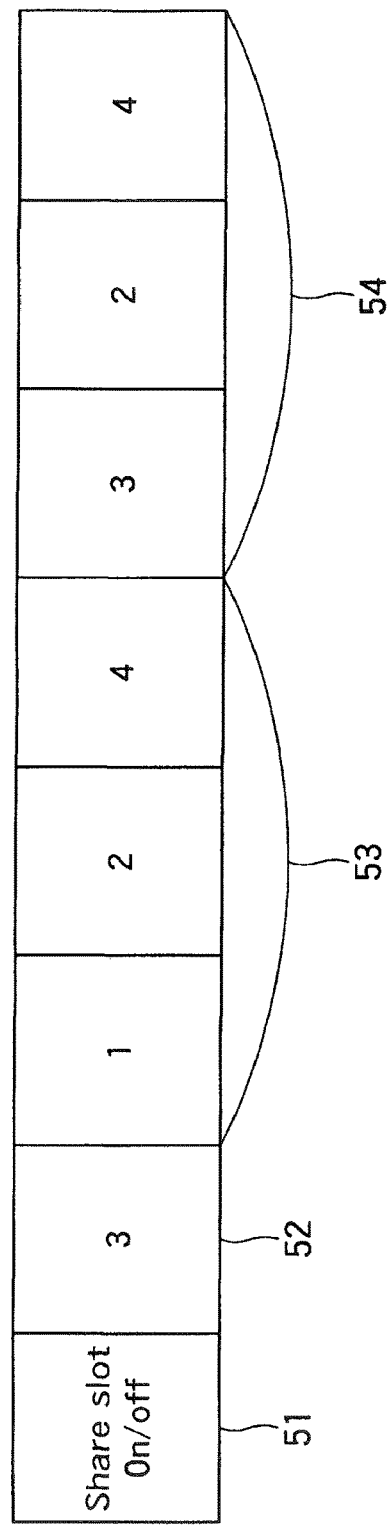
FIG. 10 is a view showing a format of a signal for notifying slot sharing information according to a fourth embodiment.

FIG. 10 illustrates a format of a signal for notifying the slot sharing information by the hub. The example shown in FIG. 10 includes a slot shared function On/Off bit field 51, a field 52 in which the number of transmission timing is set, a field 53 and a filed 54. The field 53 indicates a transmittable device or a type of a transmittable frame (device/frame type) in each transmission timing in the allocation-based access period, and the field 54 indicates a transmittable device or a type of a transmittable frame (device/frame type) in each transmission timing in the contention-based access period.

The slot shared function On/Off bit field is a bit to indicate whether a slot sharing is performed as in the first or second embodiment. That is, the bit indicates whether a frame transmission is executable at a timing other than a start timing of the slot as in the first or second embodiment.

In a case of "ON" bit, the slot sharing is performed based on the set values of fields 52 to 54. In a case of "Off" bit, the slot sharing as shown in the first or second embodiment is not performed. In the case of not performing the slot sharing, when the node transmits a frame in the contention-based access period, the node always transmits the frame at the start timing of the slot according to a predetermined transmission probability with the slotted Aloha. In the allocation-based access period, the node does not perform transmission at the first or the second timing in the slots allocated to other nodes or the slots not allocated to any node.

The number of the transmission timings is a number of transmission timings set in the slot. In a case of the first embodiment, the allocation-based access period and the contention-based access period have two start timing, i.e., the start timing (head) of the slot and the first timing, respectively. Accordingly, the number of transmission timings is two. In a case of the second embodiment, the allocation-based access period and the contention-based access period have three transmission timings, i.e., a head of the slot, the first timing and the second timing. Accordingly, the number of the transmission timings is three. Assumed that the number of transmission timings is same in each of both period, and therefore, the field 52 of the number of the transmission timings includes one value. However, in a case that the number of transmission timings is different in each period, the field 52 may include individually respective values.

In the fields 52, 53 corresponding to each access period, the transmittable device or the type of transmittable frame (device/frame type) are arranged as respective identifiers by the number of the above timing, in an order from the left side. In the example shown in drawing, identifier 1 indicates "owner" (frame of the allocated node), identifier 2 indicates "emergency" (emergency data frame), identifier 3 indicates "C/M frame" (control frame or management frame), and identifier 4 indicates "others" (other data frame). In a case that the number of transmission timings is two, two identifiers are arranged in the field 53, 54, respectively, and the start timing of the slot and the first timing are associated in an order from the left side. In a case that the number of transmission timings is three, three identifiers are arranged in the field 53, 54, respectively, and the start timing of the slot, the first timing and the second timing are associated in an order from the left side.

In the present example, in the allocation-based access period, the start timing of the slot is set for the node allocated the slot, the first timing is set for the emergency data frame, and the second timing is set for other data frames. In the contention-based access period, the start timing of the slot is set for the control frame or the management frame, the first timing is set for the emergency data frame, and the second timing is set for other data frames.

The signal format shown in FIG. 10 is one example, and another format may be used as long as same or similar information can be informed.

In a case that the slot shared function On/Off bit or the number of transmission timings are predetermined as specific, these fields may be omitted. Alternatively, the number of transmission timings and device/frame type are predetermined as specification, fields 52 to 54 related to the number of transmission timings and device/frame type may be omitted. In the latter case, the slot shared function On/Off bit only is set in the beacon signal.

As stated above, according to the present embodiment, information required to share slots between the hub and nodes is notified to each node or previously set in each node and effective communication with the hub can be realized.

Fifth Embodiment

In the first to fourth embodiments, a case is assumed that all of nodes belonging to the hub have the slot shared function (i.e., the slot shared function of FIG. 10 is "On"). In the fifth embodiment, a case is considered that the slot shared function is option, and all of the nodes do not necessarily have the slot shared function. Consider that in a similar fashion to the hub, each node have a function of notifying whether it has the slot shared function to the hub. The each node and the hub transmits/receives frames relating to connection processing such as the connection request and the connection assignment when each node connects to the hub.

In the frames, there is a field called capability field, which notifies compatible state with each of functions in the hub/node-self. By this utilizing, capability information on the slot shared function of the node is notified to the hub by way of a reserved bit of the capability field. Alternatively, other field than the capability field may be used to notify the capability information to the hub as long as the definition of the field is recognized commonly between the hub and the node.

Below, a method of controlling according to the capability information of the slot shared function of each node belonging to the hub is explained at three cases, respectively.

In the first case, the hub enables its slot shared function only when the capability information of the slot shared function of all nodes belonging to the hub is "On". For example, regarding to the newly connected node, when the capability information of its slot shared function is "Off", the hub disables its slot shared function on or from a next beacon after transmitting a response frame to a connection request frame from the newly connected node. Also, when, during a time period in which the system operates with the slot shared function "off", the above node having the capability information "Off" is disconnected, the hub subsequently transmits the beacon signal by setting the slot shared function to "On". In the first case, the slot shared function is enabled (i.e., set to "ON") only when the capability information of the slot shared function in all of the nodes is "On". As another example, when the capability information in a predetermined number of nodes or more are "On", or when the capability information in a predetermined ratio of nodes or more are "On", the hub enables the slot shared function, and otherwise, the hub disables the slot shared function.

In the second case, the hub operates with its slot shared function "On" even if there is the node which has capability information "Off" out of the nodes belonging to the hub. In the allocation-based access period, the node having the capability information "Off" cannot implement the slot sharing and the node having the capability information "On" can implement the slot sharing. Therefore, the node having the capability information "Off" never has harmful effect.

In the contention-based access period, the node having the capability information "Off" possibly attempts to perform transmission at the start timing of the slot regardless of a type of the transmission frame. For this reason, the frame collision may occur among the nodes. For example, assumed that the start timing of the slot is assigned to the emergency data frame and the first timing is assigned to the control frame or the management frame. In this case, the node having the capability information "Off" may transmit the control frame or the management frame at the start timing of the slot and the node having the capability information "On" may transmit the emergency data frame at the start timing of the slot. If this occurs, the transmitted control or management frame and the emergency data frame may collide with each other. However, this problem will be resolved by reducing a value of the predetermined transmission probability or the like at the time of retransmission.

In the third case, in a similar way to the second case, the hub operates with the slot shared function "On". The hub notifies, by the beacon signal etc., whether there is the node having the capability information "Off" out of the nodes belonging to the hub. For example, in addition to the slot shared function On/Off bit, the "slot shared Off node's belonging" field is provided and a bit in the field is set to "On" resulting in that the existence of the node having the capability information "Off" is notified. Upon receiving the information that the capability information is "On" and the bit of "slot shared Off node's belonging" is "On", the node implements the slot sharing in the allocation-based access period although the node does not implement the slot sharing, in the contention-based access period. Such processing can be realized.

Sixth Embodiment

In the sixth embodiment, the operation of the hub is explained in detail.

The hub fundamentally performs transmission of the beacon signal, reception of the sensor data from the nodes and transmission of response signals (ACK etc.) therefor.

Also, the hub transmits downlink data to the node such as software update or the like according to circumstances. When the downlink data is generated, for example, the hub performs frame transmission processing in a specified slot etc. in the allocation-based access period or the contention-based access period. In the hub, the emergency data may be generated to be addressed to the node. In this case, the hub also transmits the data to the node. As described here, the hub may transmit, like the node, the emergency data frame, the control frame or the management frame, or other data frames. In this case, the hub transmits each frame by using the same method for the slot sharing as the node.

When the hub performs reception processing on the frame from each node, the hub determines whether the reception signal is detected the start timing of the slot and Xth timing in each slot. When the first and second timing are set for the slot, existence or non-existence of detection of the reception signal is determined at the first timing and the second timing as the Xth timing. If the reception signal is detected, the hub transmits a response signal therefor.

Figure 11A:
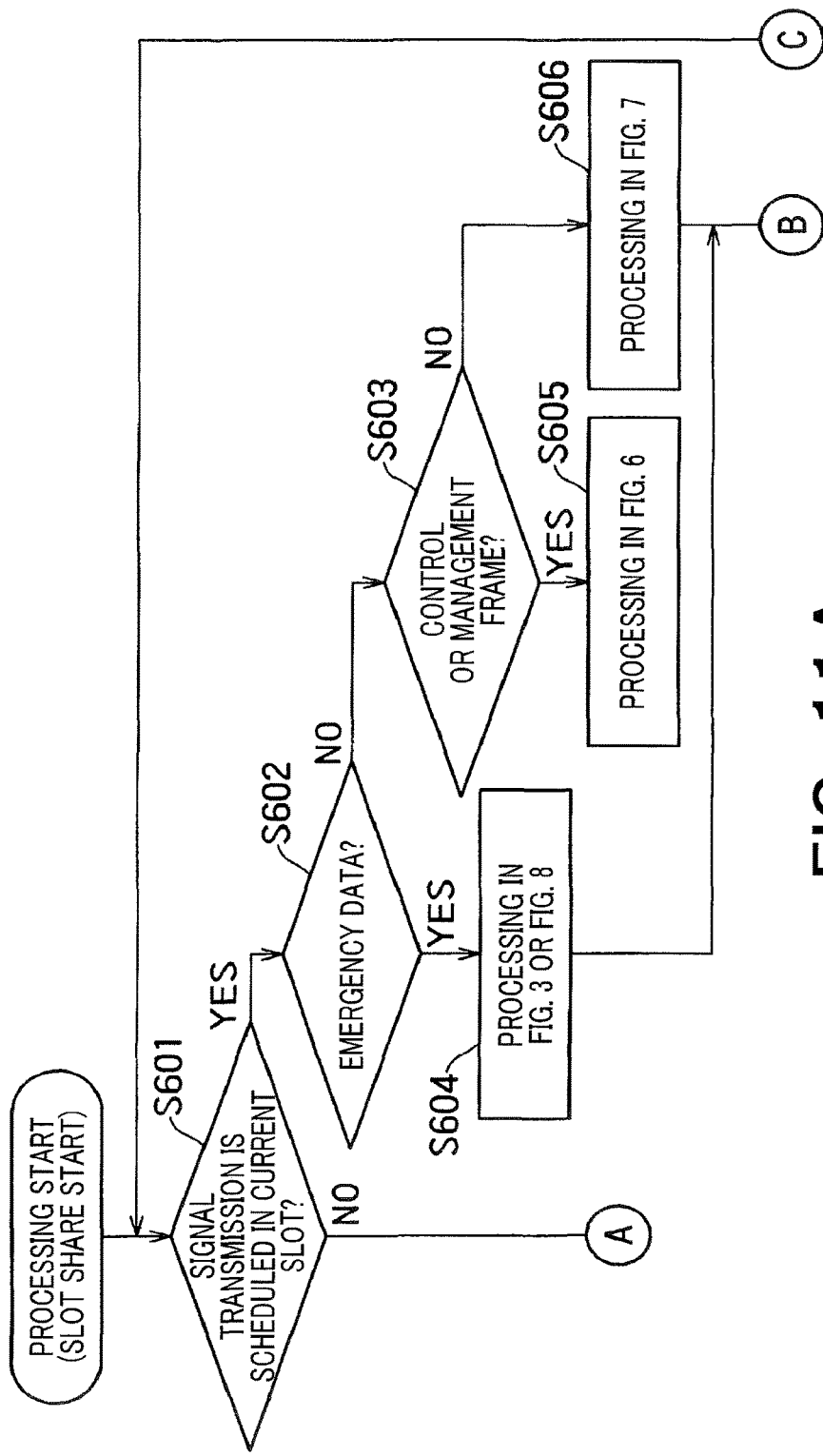
FIG. 11A is a flow chart of an operation of a hub according to a sixth embodiment.
Figure 11B:
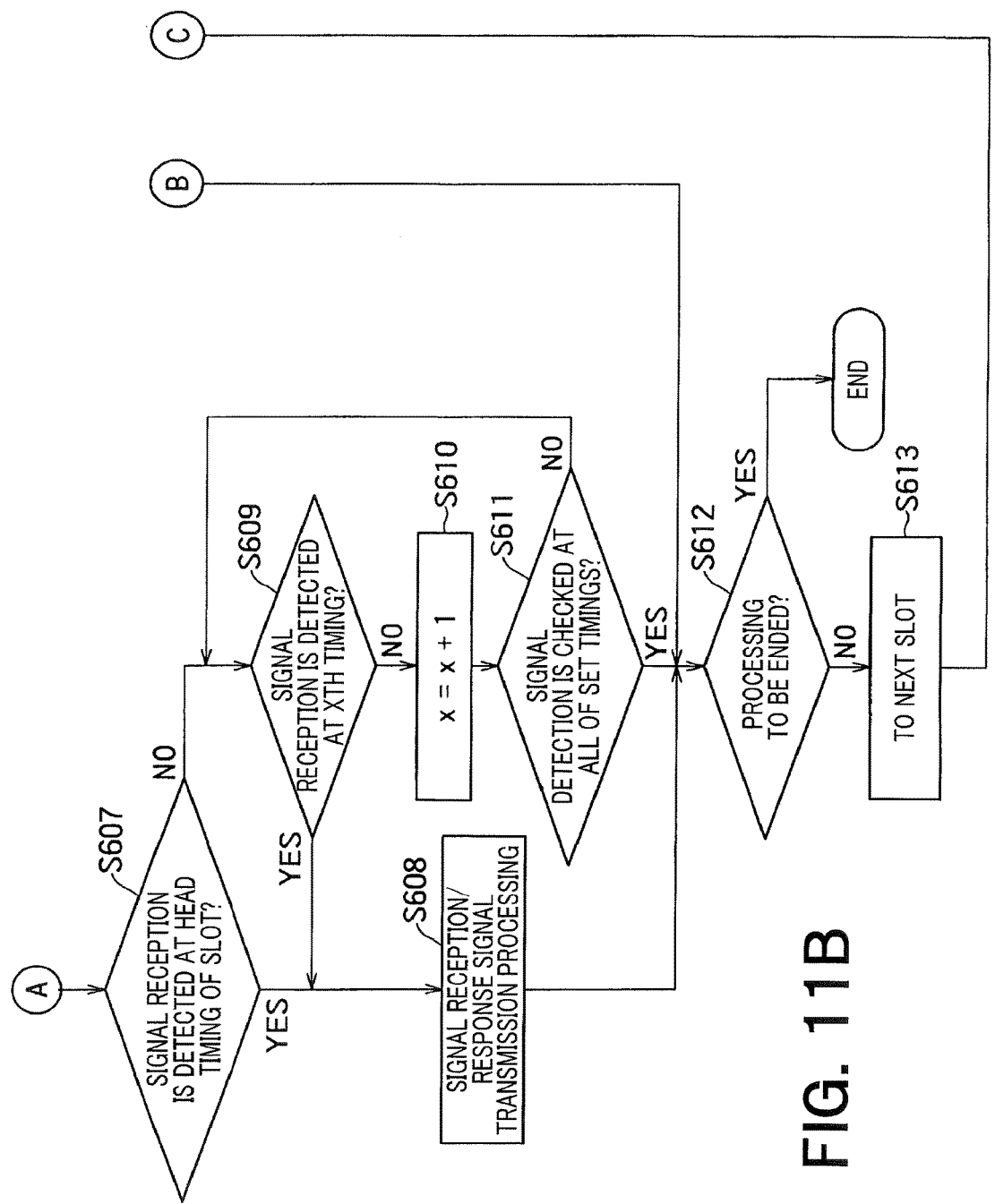
FIG. 11B is a flow chart following FIG. 11A.

FIG. 11A and FIG. 11B shows a flowchart of an operation by the hub according to the present embodiment.

The access controller 33 of the hub determines whether a frame transmission is scheduled in the target slot (S601). When the frame transmission is scheduled, the hub determines whether the transmission frame is either the emergency data frame, the control frame, the management frame, or other data frames (S602, S603). In a case of the emergency data frame, the hub performs an operation of processing shown in FIG. 3 or FIG. 8 (S604). In a case of the control frame or the management frame, the hub performs an operation of processing shown in FIG. 6 (S605). In a case of other data frames (update data of software etc.), the hub performs an operation of processing shown in FIG. 7 (S606). After step S604, S605, S606, the hub determines whether the processing ends (S612). When the processing is determined to not end, the processing proceeds to the next slot (S613), and then returns to step S601. When the processing is determined to end, the hub ends the processing.

Processing shown in FIG. 3, FIG. 8, FIG. 6 and FIG. 7 is explained above. Except that the operating device changes from the node to the hub, the processing is same. Therefore, explanation thereof is omitted.

When the hub determines that the frame transmission is not scheduled in the target slot in step S601, the hub determines whether the reception signal is detected at the start timing of the target slot (S607). When the reception signal is detected, the hub performs processing of the reception signal in the reception processor 32 and controls to generate and transmit a frame for a response signal in the transmission processor 30 (S608).

When the reception signal is not detected at the start timing of the slot, the hub sets X to 1 and determines whether the reception signal is detected at an Xth timing (i.e., a first timing) (S609). When the reception signal is detected, the processing proceeds to step S608. In step S608, the above reception processing, the generating of the frame for the response signal and transmission processing of the frame are performed. When the reception signal is not detected at the first timing, X is incremented by 1 and similar processing is iterated (S609, S610, S611). Unless the reception signal is detected, the X is incremented and similar processing is iterated until all of timings set for the slot are examined in sequence thereof (S611). For example, when timings set for the slot are the first timing and the second timing except the start timing, the X is incremented two times at most.

When the reception signal is not detected at all of the timings (YES in S611) or after step S605 is performed, the hub determines whether the processing ends (S612). When the processing is determined to not end, the processing proceeds to the next slot (S613), and then returns to step S601. When the processing is determined to end, the hub ends the processing.

Seventh Embodiment

Figure 12:
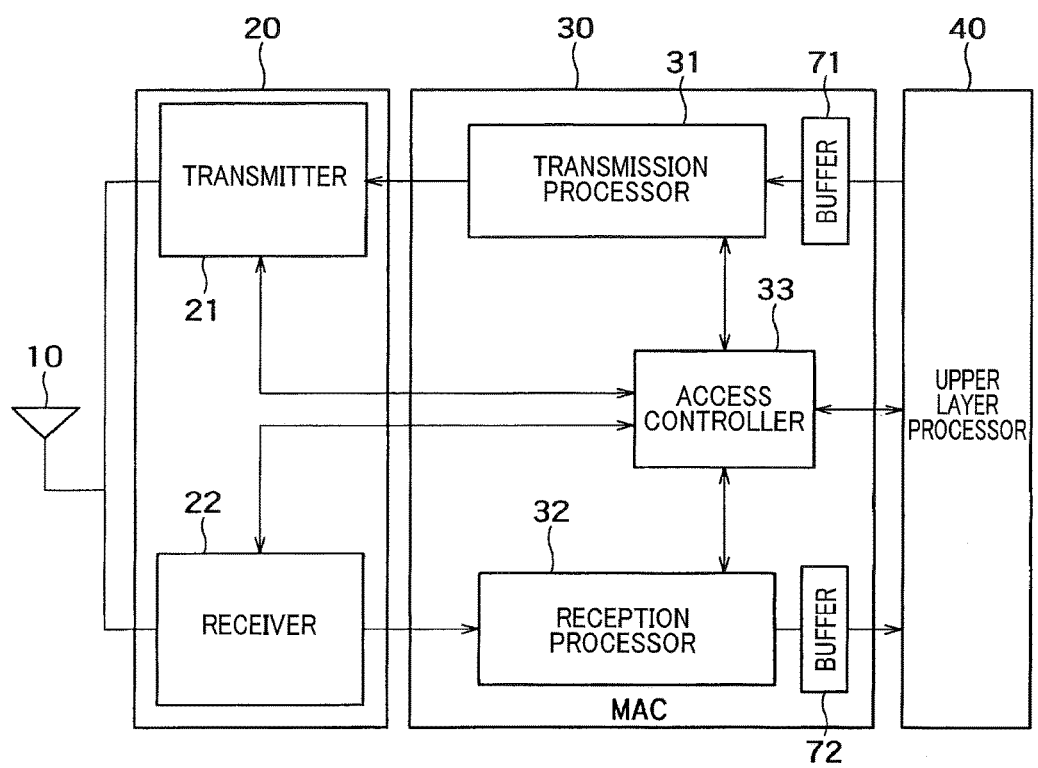
FIG. 12 is a block diagram of a wireless communication device which is a hub according to a seventh embodiment.

FIG. 12 shows a block diagram of a wireless communication device as a hub according to a seventh embodiment.

In the hub shown in FIG. 12, buffers 71 and 72 are added to the MAC unit 30 of the wireless communication device according to the first embodiment shown in FIG. 4A. The buffers 71 and 72 are connected to the transmission processor 31 and the reception processor 32. The upper layer processor 40 performs input and output with the transmission processor 31 and the reception processor 32 through the buffers 71 and 72. The buffers 71 and 72 can be, for example, arbitrary volatile memories or non-volatile memories. In this way, the buffers 71 and 72 can be provided to hold the transmission frame and the reception frame in the buffers 71 and 72. The retransmission process, QoS control according to the frame type etc. or the output process to the upper layer processor 40 can be easily performed.

The configuration of adding the buffers can be similarly applied to the node.

Figure 13:
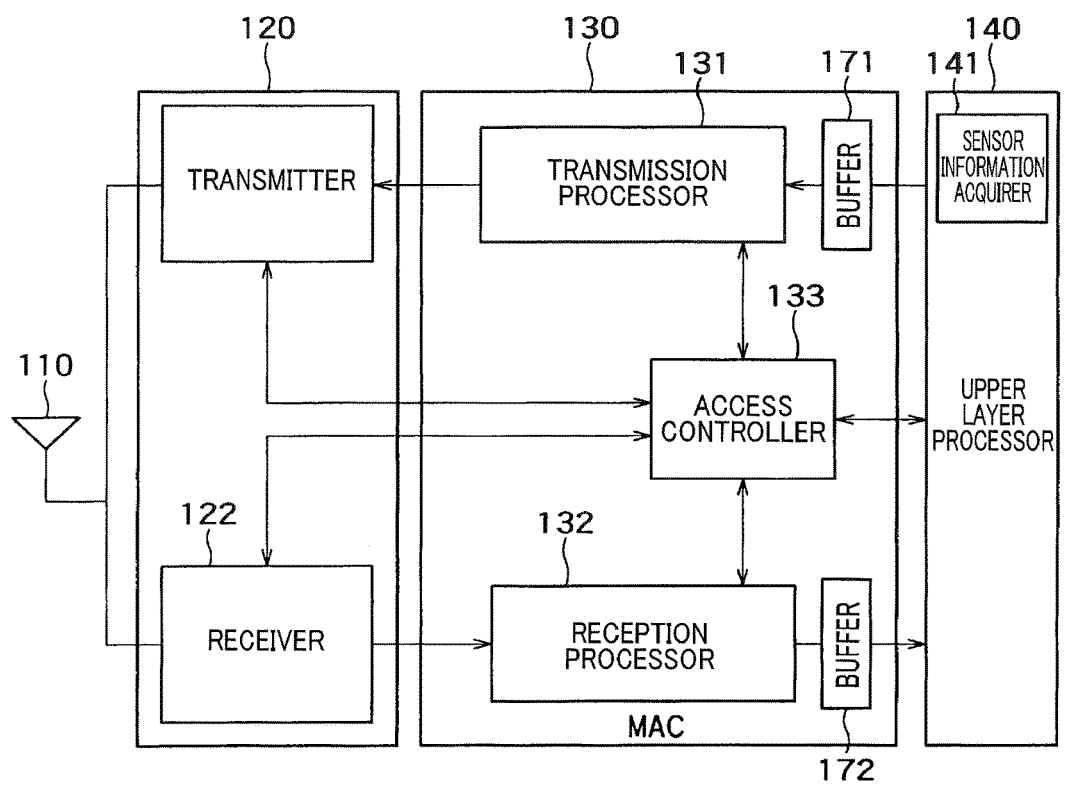
FIG. 13 is a block diagram of a wireless communication device which is a node according to a seventh embodiment.

FIG. 13 shows a block diagram of a wireless communication device as a node according to a seventh embodiment.

In the node shown in FIG. 13, buffers 171 and 172 are added to the MAC unit 130 of the wireless communication device according to the first embodiment shown in FIG. 4B. The buffers 171 and 172 are connected to the transmission processor 131 and the reception processor 132, respectively.

The upper layer processor 140 performs input and output with the transmission processor 131 and the reception processor 132 through the buffers 171 and 172. The buffers 171 and 172 can be, for example, arbitrary volatile memories or non-volatile memories. In this way, the buffers 171 and 172 can be provided to hold the transmission data and the reception data in the buffers 171 and 172. The retransmission process, QoS control according to the frame type etc., or the output process to the upper layer processor 140 can be easily performed.

Eighth Embodiment

Figure 14:
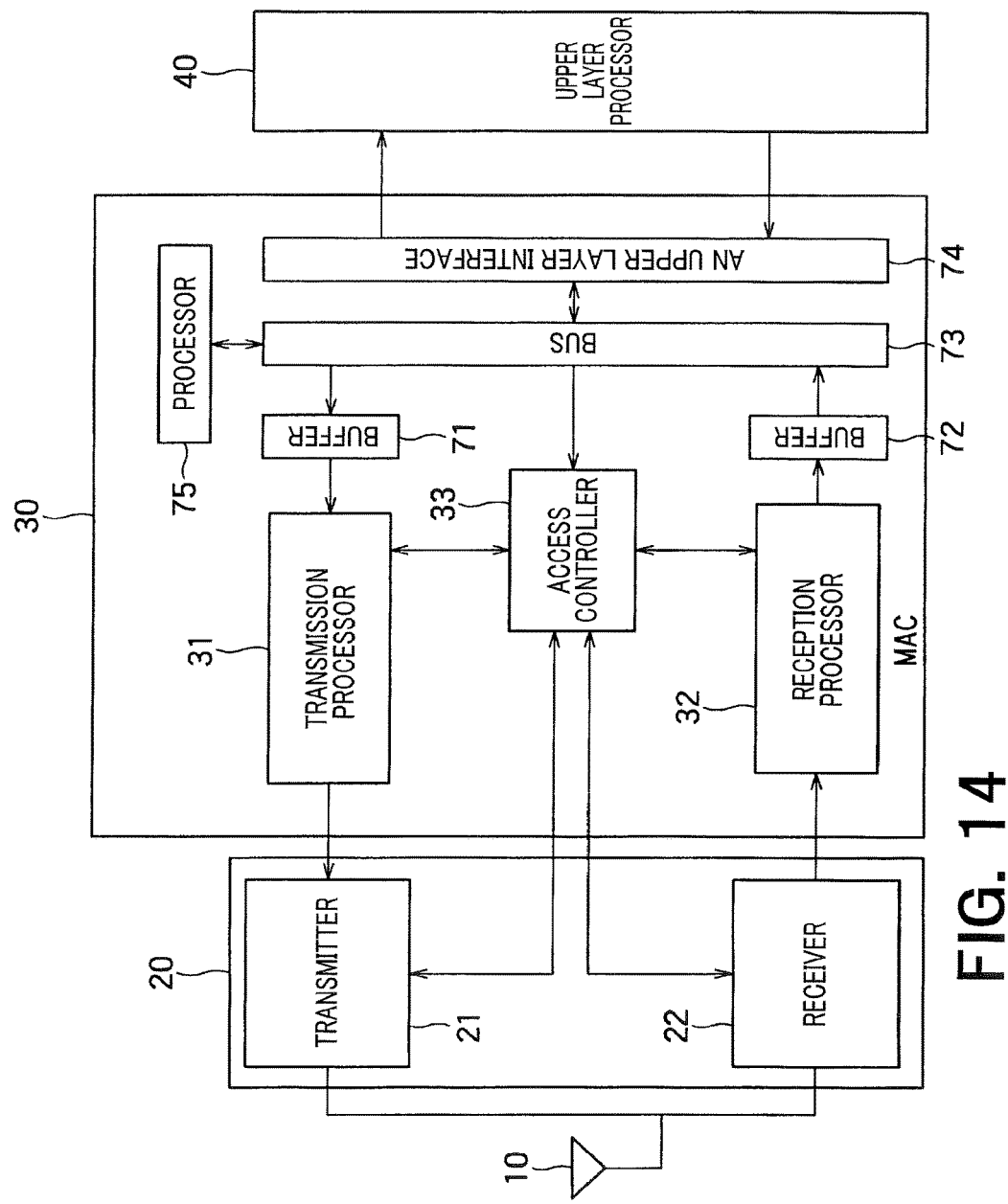
FIG. 14 is a block diagram of a wireless communication device which is a hub according to an eighth embodiment.

FIG. 14 shows a block diagram of a wireless communication device as a hub according to an eight embodiment.

The hub illustrated in FIG. 14 has a form that a bus 73 is connected to the buffers 71 and 72 and the access controller 33 in the seventh embodiment illustrated in FIG. 12, and an upper layer interface 74 and a processor 75 are connected to the bus 73. The MAC unit 30 is connected with the upper layer processor 40 at the upper layer interface 74. In the processor 75, firmware is operated. By rewriting the firmware, functions of the wireless communication device can be easily changed. The function of the access controller 33 may be achieved by the processor 75.

Figure 15:
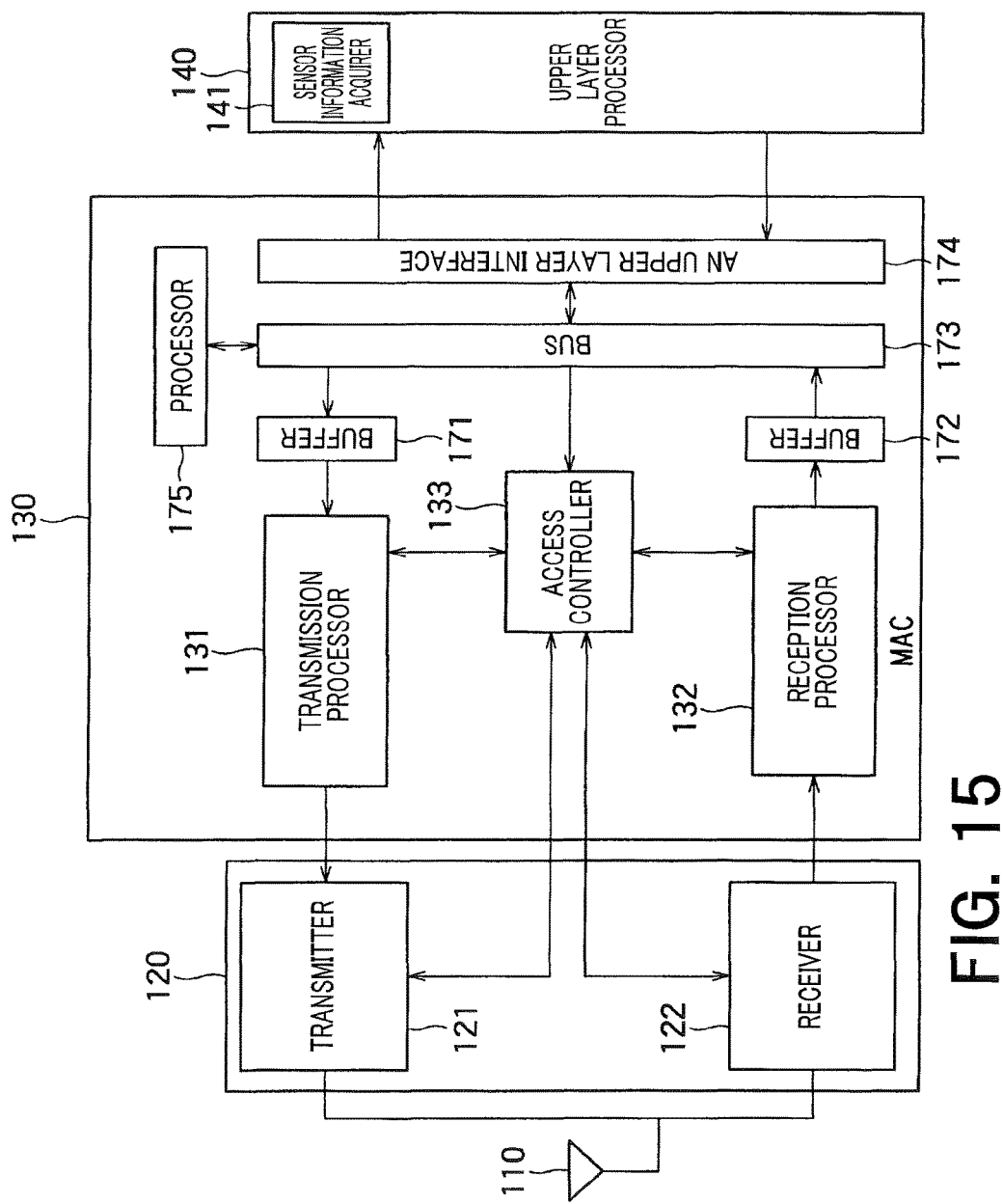
FIG. 15 is a block diagram of a wireless communication device which is a node according to an eighth embodiment.

FIG. 15 shows a block diagram of a wireless communication device as a node according to an eight embodiment.

The node illustrated in FIG. 15 has a form that a bus 173 is connected to the buffers 171 and 172 and the access controller 133 in the seventh embodiment illustrated in FIG. 13, and an upper layer interface 174 and a processor 175 are connected to the bus 173. The MAC unit 130 is connected with the upper layer processor 140 at the upper layer interface 174. In the processor 175, the firmware is operated. By rewriting the firmware, functions of the wireless communication device can be easily changed. The function of the access controller 133 may be achieved by the processor 175.

Ninth Embodiment

Figure 16:
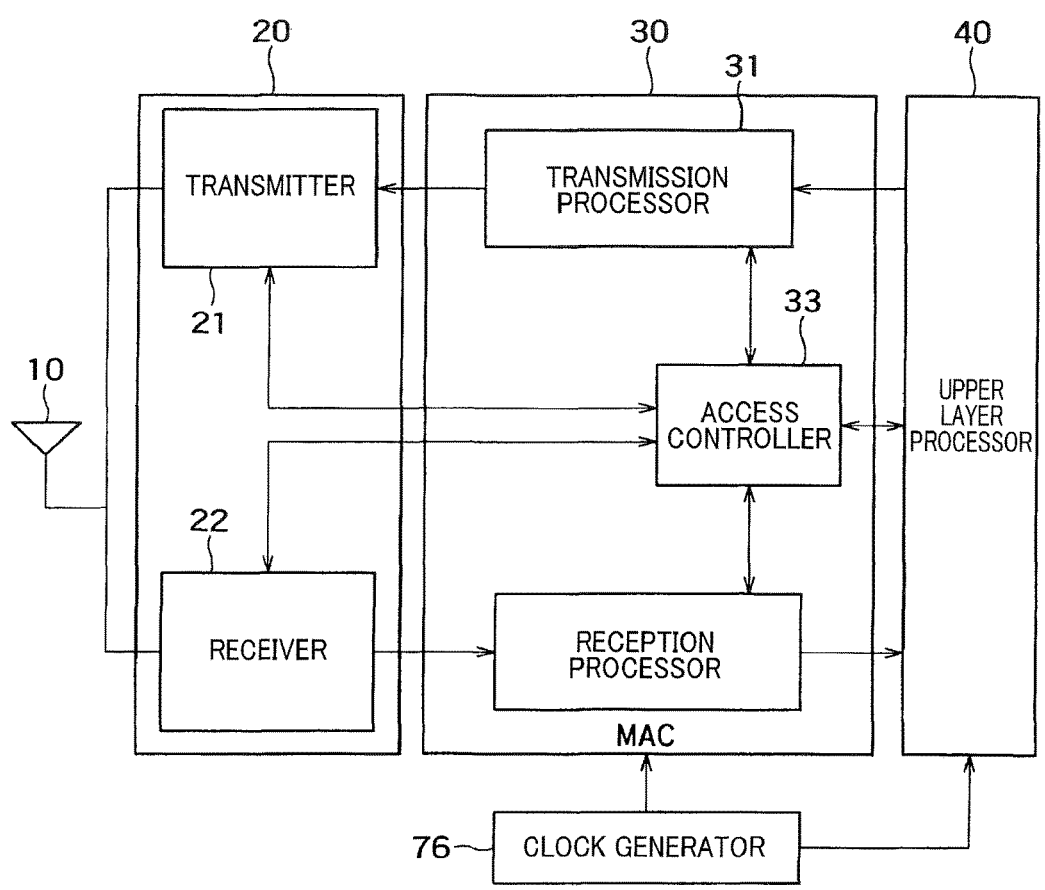
FIG. 16 is a block diagram of a wireless communication device which is a hub according to a ninth embodiment.

FIG. 16 shows a block diagram of a wireless communication device as a hub according to a ninth embodiment.

The wireless communication device illustrated in FIG. 16 has a form that a clock generator 76 is connected to the MAC unit 30 in the hub relating to the first embodiment illustrated in FIG. 4A. The clock generator 76 is connected through an output terminal to an external host (the upper layer processor 40 here), and a clock generated by the clock generator 76 is given to the MAC unit 30 and is also outputted to the external host. By operating the host by the clock inputted from the clock generator 76, a host side and a wireless communication device side can be operated in synchronism. In this example, the clock generator 76 is arranged on the outer side of the MAC unit, however, it may be provided inside the MAC unit.

Figure 17:
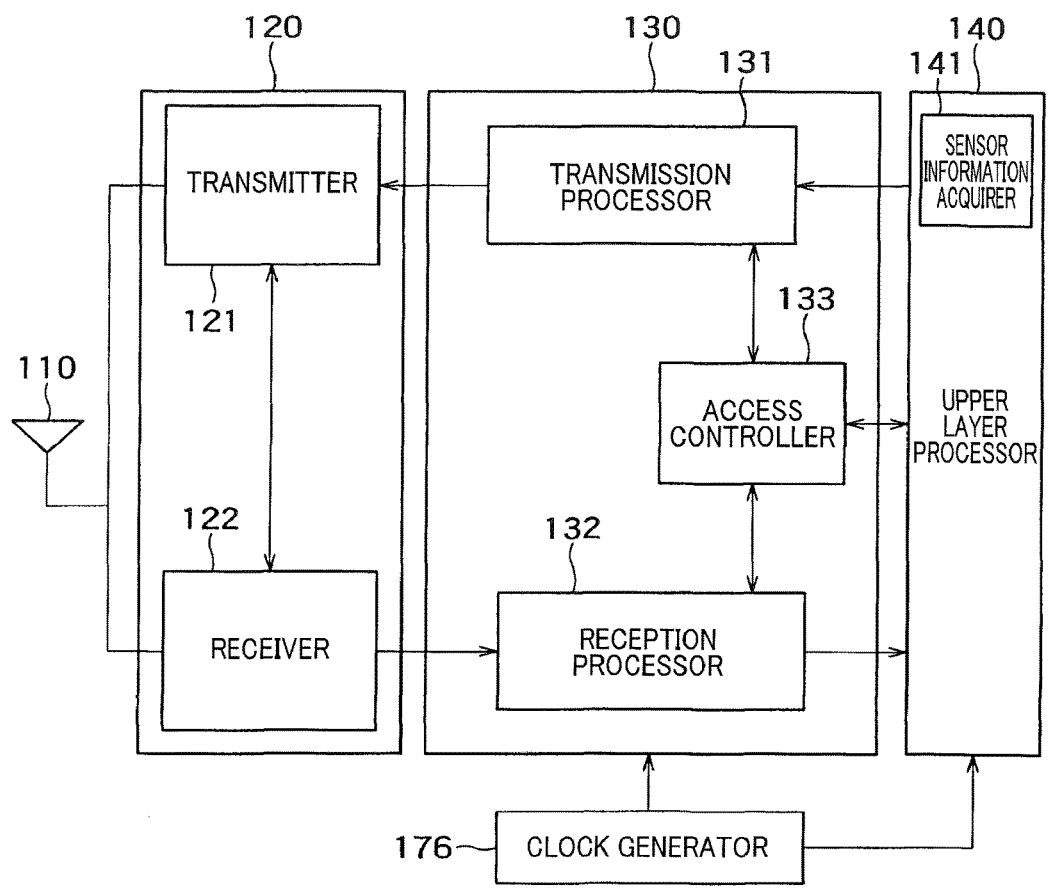
FIG. 17 is a block diagram of a wireless communication device which is a node according to a ninth embodiment.

FIG. 17 shows a block diagram of a wireless communication device as a node according to a ninth embodiment.

The wireless communication device illustrated in FIG. 17 has a form that a clock generator 176 is connected to the MAC unit 130 in the node relating to the first embodiment illustrated in FIG. 4B. The clock generator 176 is connected through an output terminal to an external host (the upper layer processor 140 here), and a clock generated by the clock generator 176 is given to the MAC unit 130 and is also outputted to the external host. By operating the host by the clock inputted from the clock generator 176, the host side and the wireless communication device side can be operated in synchronism. In this example, the clock generator 176 is arranged on the outer side of the MAC unit, however, it may be provided inside the MAC unit.

Tenth Embodiment

Figure 18:
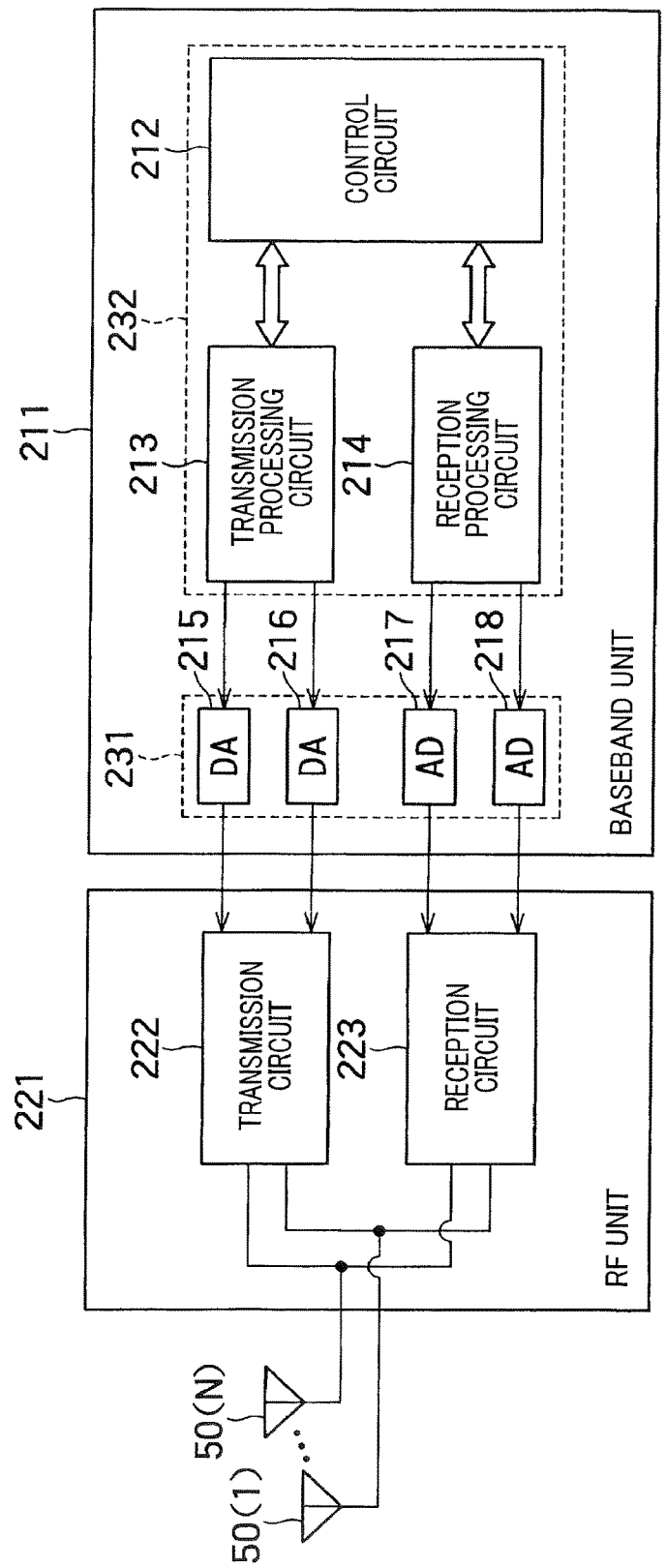
FIG. 18 is a hardware block diagram of a wireless communication device according to a tenth embodiment.

FIG. 18 illustrates an example of a hardware configuration of a wireless communication device in accordance with an eleventh embodiment. This hardware configuration is only provided by way of example, and various modifications can be made to this hardware configuration. The operation of the wireless communication device illustrated in FIG. 18, detailed description of which is omitted, proceeds in the same or similar manner as in the wireless communication devices described in the context of the previous embodiments, and the following explanation focuses on the differences in respect of the hardware configuration. It should be noted that the illustrated hardware configuration can be applied both to the wireless communication device that operates as a base station and to the wireless communication device that operates as a slave station.

This wireless communication device includes a baseband unit 211, an RF unit 221, and antennas 50(1) to 50(N) (where N is an integer equal or larger than one).

The baseband unit 211 includes a control circuit (or control circuitry) 212, a transmission processing circuit 213, a reception processing circuit 214, DA conversion circuits 215, 216, and AD conversion circuits 217, 218. The RF unit 221 and the baseband unit 211 may be collectively configured as one-chip IC (integrated circuit) or may be configured as independent chips.

As one example, the baseband unit 211 is a baseband LSI or a baseband IC. Alternatively, the baseband unit 211 may include an IC 232 and an IC 231 in the illustrated manner as indicated by dotted lines. In this context, components may be incorporated in a distributed manner on these ICs such that the IC 232 includes the control circuit 212, the transmission processing circuit 213, and the reception processing circuit 214 while the IC 231 includes the DA conversion circuits 215, 216 and the AD conversion circuits 217, 218. The control circuit 212, the transmission processing circuit 213, the reception processing circuit 214, or any combination thereof includes control circuitry.

The control circuit 212 is mainly configured to execute the functionality of the MAC processor 30 and 130 of FIGS. 3A and 3B, etc. The functionality of the upper layer processor 40 and 140 may be included in the control circuit 112.

The transmission processing circuit 213 corresponds to the section that performs the processing before DA conversion processing in the transmitter 21 and 121 in FIGS. 3A and 3B, etc. Specifically, the transmission processing circuit 213 mainly performs processing associated with the physical layer including addition of a preamble and a PHY header, encoding, modulation (which may include MIMO modulation), and generates, for example, two types of digital baseband signals (hereinafter referred to as the digital I-signal and Q-signal). It should be noted that another configuration can be contemplated according to which the functionality performed before DA conversion processing in the transmitter 21 and 121 of FIGS. 3A and 3B, etc. may be included in the transmission processing circuit 213, the functionality performed after AD conversion processing in the receiver 22 and 122 may be included in the reception processing circuit 214.

The communication processing device of this embodiment corresponds, for example, to the control circuit 212, the transmission processing circuit 213, and the reception processing circuit 214. The communication processing device of this embodiment may take either configuration of a one-chip IC configuration or a multiple-chip IC configuration.

The DA conversion circuits 215 and 216 correspond to the section associated with the digital-to-analog conversion in the transmitter 21 and 121 of FIGS. 3A and 3B, etc. The DA conversion circuits 215 and 216 are configured to perform digital-to-analog conversion for the signals input from the transmission processing circuit 213. More specifically, the DA conversion circuit 215 converts a digital I-signal into an analog I-signal, and the DA conversion circuit 216 converts a digital Q-signal into an analog Q-signal. It should be noted that there may be a case where the signals are transmitted as single-channel signals without the quadrature modulation being performed. In this case, it suffices that one single DA conversion circuit is provided. In addition, when transmission signals of one single channel or multiple channels are transmitted in a distributed manner in accordance with the number of antennas, DA conversion circuits may be provided in the number corresponding to the number of the antennas.

The RF unit 221, by way of example, is an RF analog IC or a high-frequency wave IC. The transmitting circuit 222 in the RF unit 221 corresponds to the section associated with the processing following the digital-to-analog conversion out of the functions of the transmitter 21 and 121 illustrated in FIGS. 3A and 3B, etc. The transmitting circuit 222 includes a transmission filter that extracts a signal of a desired bandwidth from the signal of the frame that has been subjected to the digital-to-analog conversion by the DA conversion circuits 215 and 216, a mixer that performs up-conversion for the signal that has been subjected to the filtering to the wireless frequency using a signal having a predetermined frequency supplied from an oscillation device, a pre-amplifier (PA) that performs amplification for the signal that has been subjected to the up-conversion, and the like.

The receiving circuit 223 in the RF unit 221 corresponds to the section associated with the processing prior to the analog-to-digital conversion from among the functions of the receiver 22 and 122 illustrated in FIGS. 3A and 3B, etc. The receiving circuit 223 includes an LNA (low noise amplifier) that amplifies the signal received by the antenna, a mixer that performs down-conversion of the amplified signal to the baseband using a signal having a predetermined frequency supplied from an oscillation device, a reception filter that extracts a signal of a desired bandwidth from the signal that has been subjected to the down-conversion, and the like. More specifically, the receiving circuit 223 performs quadrature demodulation for the reception signal, which has been subjected to the low noise amplification by a low noise amplifier, by carrier waves with 90 degree phase shift with respect to each other and thus generates an I-signal (In-phase signal) having the same phase as that of the reception signal and a Q-signal (Quad-phase signal) whose phase is delayed by 90 degrees with respect to the reception signal. The I-signal and the Q-signal are output from receiving circuit 223 after being subjected to the gain adjustment.

The control circuit 212 may control the operation of the transmission filter of the transmitting circuit 222 and the reception filter of the receiving circuit 223. Another controller that controls the transmitting circuit 222 and the receiving circuit 223 may be provided and the same or similar control may be realized by the control circuit 212 sending instructions to that controller.

The AD conversion circuits 217, 218 in the baseband unit 211 correspond to the section of the receiver 22 and 122 that performs the analog-to-digital conversion as illustrated in FIGS. 6 and 7, etc. The AD conversion circuits 217, 218 perform analog-to-digital conversion for the input signal that is input from the receiving circuit 223. More specifically, the AD conversion circuit 217 converts the I-signal into a digital I-signal and the AD conversion circuit 218 converts the Q-signal into a digital Q-signal. It should be noted that quadrature demodulation may not be performed and only a single-channel signal may be received. In this case, only one AD conversion circuit has to be provided. In addition, when a plurality of antennas are provided, AD conversion circuits in the number corresponding to the number of the antennas may be provided. The reception processing circuit 214 corresponds to the section that performs the processing following the AD conversion processing in the receiver 22 and 122 as illustrated in FIGS. 3A and 3B, etc. Specifically, the reception processing circuit 214 performs demodulation processing for the signal that has been subjected to the analog-to-digital conversion, processing of removing the preamble and the PHY header, and the like processing, and delivers the frame that has been processed to the control circuit 212.

It should be noted that a switch may be arranged in the RF unit for switching the antennas 50(1) to 50(N) between the transmitting circuit 222 and the receiving circuit 223. By controlling the switch, the antennas 50(1) to 50(N) may be connected to the transmitting circuit 222 at the time of transmission and the antennas 50(1) to 50(N) may be connected to the receiving circuit 223 at the time of reception.

Although the DA conversion circuits 215, 2116 and the AD conversion circuits 217, 218 are arranged on the side of the baseband unit 211 in FIG. 18, another configuration may be adopted where they are arranged on the side of the RF unit 221.

It should be noted that the wireless communicator may be formed by the transmitting circuit 222 and the receiving circuit 223. The wireless communicator may be formed by further adding DAs 215, 216 and the DAs 217, 218 to the transmitting circuit 222 and the receiving circuit 223. The wireless communicator may be formed by including, along with these components, the PHY processing portions (i.e., the modulator and the demodulator) of the transmission processing circuit 213 and the reception processing circuit 214. Alternatively, the wireless communicator may be formed by the PHY reception processing portions of the transmission processing circuit 213 and the reception processing circuit 214.

Eleventh Embodiment

Figure 19:
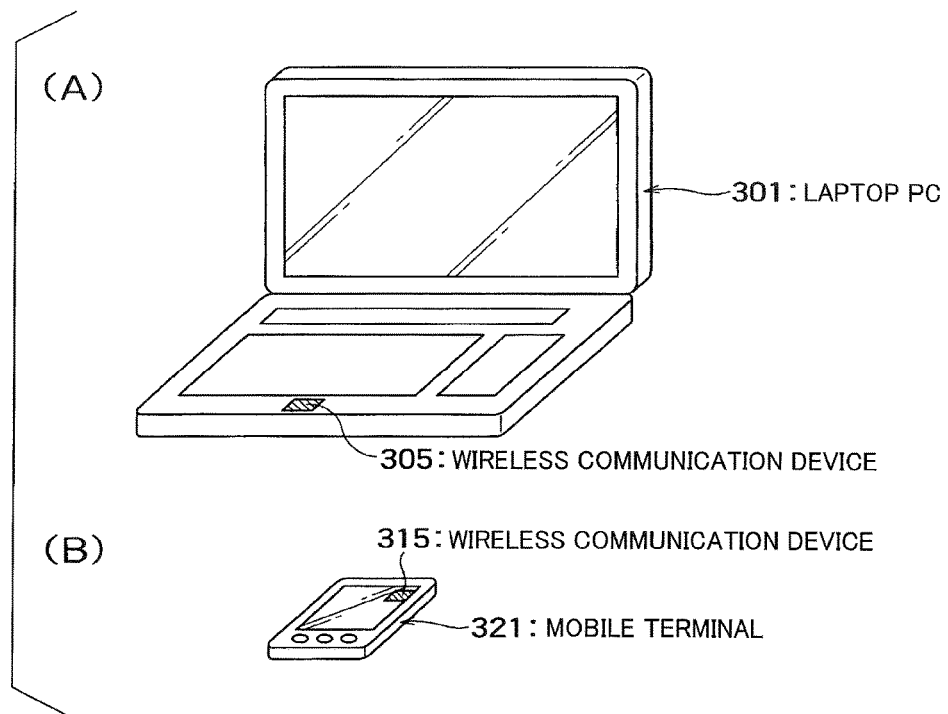
FIG. 19 is a perspective view of a wireless communication terminal according to an eleventh embodiment.

FIG. 19(A) and FIG. 19(B) are perspective views of a wireless communication terminal (wireless device) in accordance with an eleventh embodiment. The wireless device of FIG. 19(A) is a laptop PC 301 and the wireless device of FIG. 19(B) is a mobile terminal 321. They correspond, respectively, to one form of the terminal (which may operate as either the base station or the slave station). The laptop PC 301 and the mobile terminal 321 incorporate the wireless communication devices 305, 315, respectively. The wireless communication devices that are previously described may be used as the wireless communication devices 305, 315. The wireless device incorporating the wireless communication device is not limited to the laptop PC or the mobile terminal. For example, the wireless communication device may be incorporated in a television, digital camera, wearable device, tablet, smartphone, etc.

Figure 20:
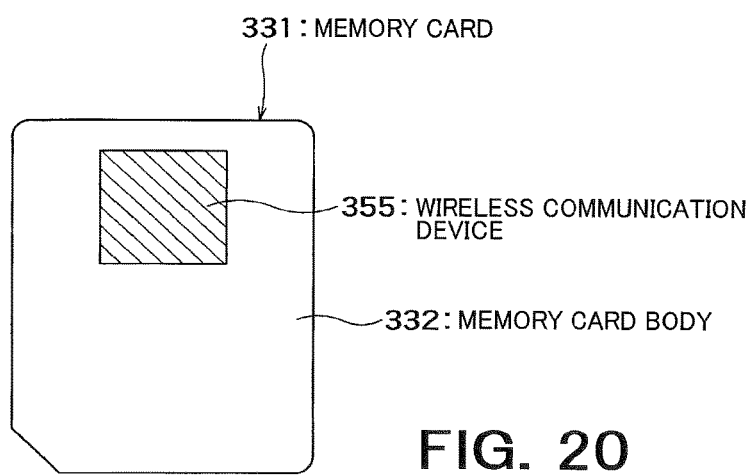
FIG. 20 is a view showing a memory card according to an eleventh embodiment.

In addition, the wireless communication device can be incorporated in a memory card. FIG. 20 illustrates an example where the wireless communication device is incorporated in the memory card. The memory card 331 includes a wireless communication device 355 and a memory card body 332. The memory card 331 uses the wireless communication device 335 for wireless communications with external devices. It should be noted that the illustration of the other elements in the memory card 331 (e.g., memory, etc.) is omitted in FIG. 20.

Twelfth Embodiment

A twelfth embodiment includes a bus, a processor, and an external interface in addition to the configuration of the wireless communication device in accordance with any one of the first to eleventh embodiments. The processor and the external interface are connected via the bus to the buffer. The firmware runs on the processor. In this manner, by providing a configuration where the firmware is included in the wireless communication device, it is made possible to readily modify the functionality of the wireless communication device by re-writing of the firmware.

Thirteenth Embodiment

A thirteenth embodiment includes a clock generator in addition to the configuration of the wireless communication device in accordance with any one of the first to eleventh embodiments. The clock generator is configured to generate a clock and output the clock on the output terminal and to the outside of the wireless communication device. In this manner, by outputting the clock generated within the wireless communication device to the outside thereof and causing the host side to operate based on the clock output to the outside, it is made possible to cause the host side and the wireless communication device side to operate in a synchronized manner.

Fourteenth Embodiment

A fourteenth embodiment includes a power source, a power source controller, and a wireless power supply in addition to the configuration of the wireless communication device in accordance with any one of the first to eleventh embodiments. The power source controller is connected to the power source and the wireless power supply, and is configured to perform control for selecting the power source from which power is supplied to the wireless communication device. In this manner, by providing a configuration where the power source is provided in the wireless communication device, it is made possible to achieve low power consumption operation accompanied by the power source control.

Fifteenth Embodiment

A fifteenth embodiment includes a SIM card in addition to the configuration of the wireless communication device in accordance with the fifteenth embodiment. The SIM card is connected, for example, to the MAC processor in the wireless communication device or to the control circuit 212, etc. In this manner, by providing a configuration where the SIM card is provided in the wireless communication device, it is made possible to readily perform the authentication processing.

Sixteenth Embodiment

A sixteenth embodiment includes a video compression/extension unit in addition to the configuration of the wireless communication device in accordance with the twelfth embodiment. The video compression/extension unit is connected to a bus. In this manner, by configuring the video compression/extension unit included in the wireless communication device, it is made possible to readily perform transfer of the compressed video and the extension of the received compressed video.

Seventeenth Embodiment

A seventeenth embodiment includes an LED unit in addition to the configuration of the wireless communication device in accordance with any one of the first to eleventh embodiments. The LED unit is connected, for example, to the MAC processor in the wireless communication device, the transmission processing circuit 213, the reception processing circuit 214, or the control circuit 212, etc. In this manner, by providing a configuration where the LED unit is provided in the wireless communication device, it is made possible to readily notify the operating state of the wireless communication device to the user.

Eighteenth Embodiment

An eighteenth embodiment includes a vibrator unit in addition to the configuration of the wireless communication device in accordance with any one of the first to fifteenth embodiments. The vibrator unit is connected, for example, to the MAC processor in the wireless communication device, the transmission processing circuit 213, the reception processing circuit 214, or the control circuit 212, etc. In this manner, by providing a configuration in which the vibrator unit is provided in the wireless communication device, it is made possible to readily notify the operating state of the wireless communication device to the user.

Nineteenth Embodiment

Figure 21:
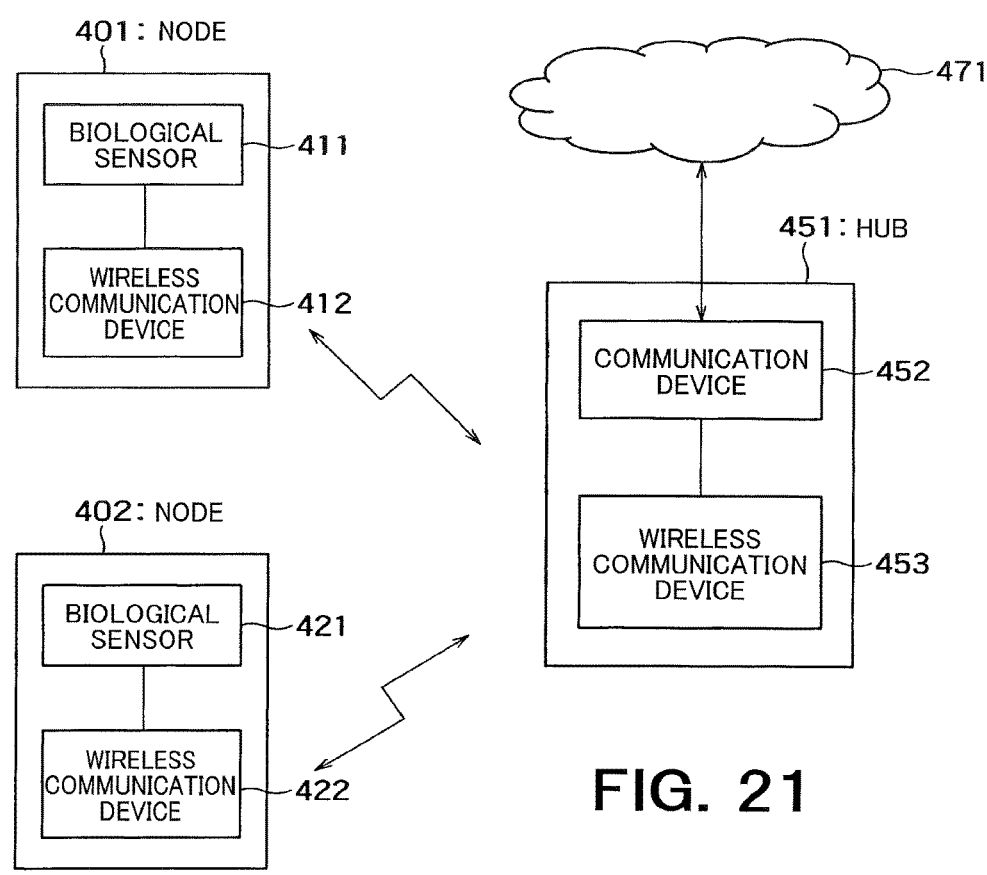
FIG. 21 is a view showing a wireless communication system according to a nineteenth embodiment.

FIG. 21 illustrates an overall configuration of a wireless communication system in accordance with a nineteenth embodiment. This wireless communication system is an example of the body area network. The wireless communication system includes a plurality of nodes including nodes 401, 402 and a hub 451. Each node and the hub are attached to the human body, and each node performs wireless communication with the hub 451. Being attached to the human body may refer to any case where it is arranged at a position near the human body such as a form in which it is in direct contact with the human body; a form in which it is attached thereto with clothes existing in between; a form in which it is provided on a strap hanging from the neck; and a form in which it is accommodated in a pocket. The hub 451 is, by way of example, a terminal including a smartphone, mobile phone, tablet, laptop PC, etc.

The node 401 includes a biological sensor 411 and a wireless communication device 412. As the biological sensor 411, for example, sensors may be used that are adapted to sense body temperature, blood pressure, pulse, electrocardiogram, heartbeat, blood oxygen level, urinal sugar, blood sugar, etc. Meanwhile, sensors adapted to sense biological data other than these may be used. The wireless communication device 412 is any one of the wireless communication devices of the embodiments that are described in the foregoing. The wireless communication device 412 performs wireless communication with the wireless communication device 453 of the hub 451. The wireless communication device 412 performs wireless transmission of the biological data (sensing information) sensed by the biological sensor 411 to the wireless communication device 453 of the hub 451. The node 401 may be configured as a device in the form of a tag.

The node 402 includes a biological sensor 421 and a wireless communication device 422. The biological sensor 421 and the wireless communication device 422, the explanations of which are omitted, are configured in the same or similar manner as the biological sensor 411 and the wireless communication device 412 of the node 401, respectively.

The hub 451 includes a communication device 452 and a wireless communication device 453. The wireless communication device 453 performs wireless communications with the wireless communication device of each node. The wireless communication device 453 may be the wireless communication device described in the context of the previous embodiments or may be another wireless communication device other than those described in the foregoing as long as it is capable of communications with the wireless communication device of the node. The communication device 452 is wire or wireless-connected to the network 471. The network 471 may be the Internet or a network such as a wireless LAN, or may be a hybrid network constructed by a wired network and a wireless network. The communication device 452 transmits the data collected by the wireless communication device 453 from the individual nodes to devices on the network 471. The delivery of data from the wireless communication device 453 to the communication devices may be performed via a CPU, a memory, an auxiliary storage device, etc. The devices on the network 471 may, specifically, be a server device that stores data, a server device that performs data analysis, or any other server device. The hub 451 may also incorporate a biological sensor in the same or similar manner as the nodes 401 and 402. In this case, the hub 451 also transmits the data obtained by the biological sensor to the devices on the network 471 via the communication device 452. An interface may be provided in the hub 451 for insertion of a memory card such as an SD card and the like and the data obtained by the biological sensor or obtained from each node may be stored in the memory card. In addition, the hub 451 may incorporate a user inputter configured to input various instructions by the user and a display for image display of the data, etc.

Figure 22:
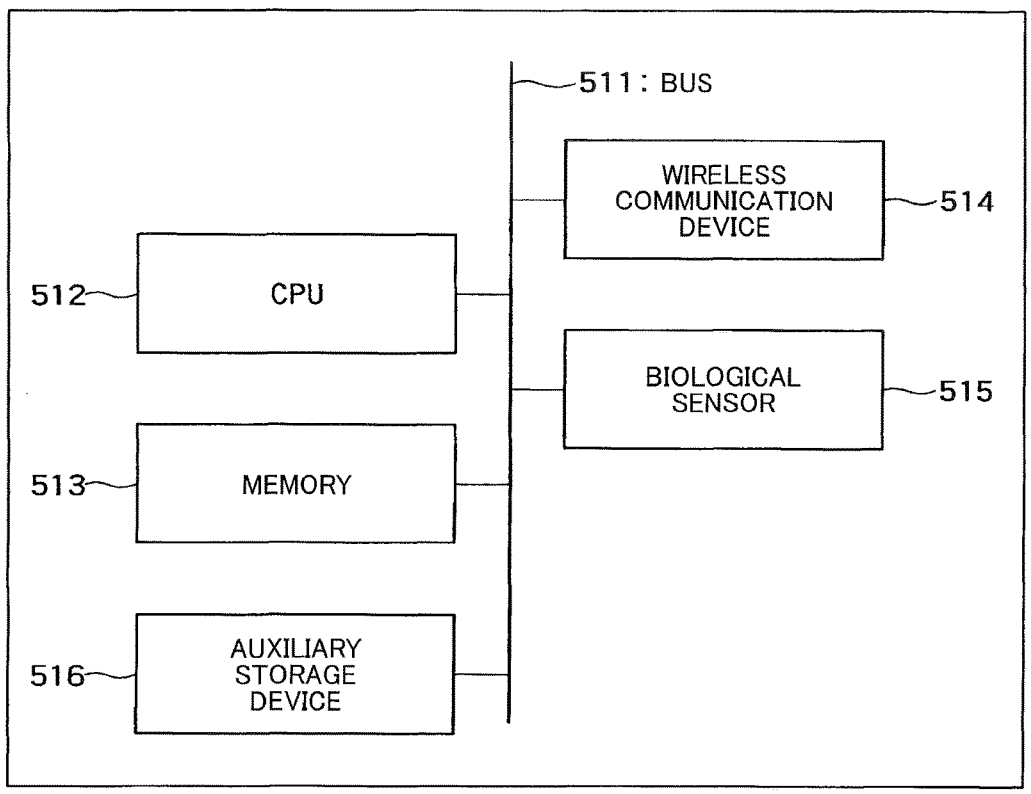
FIG. 22 is a hardware block diagram of a node according to a nineteenth embodiment.

FIG. 22 is a block diagram illustrating a hardware configuration of the node 401 or node 402 illustrated in FIG. 21. The CPU 512, the memory 513, the auxiliary storage device 516, the wireless communication device 514, and the biological sensor 515 are connected to a bus 511. Here, the individual components 512 to 516 are connected to one single bus, but a plurality of buses may be provided by a chipset and the individual units 512 to 516 may be connected in a distributed manner to the plurality of buses. The wireless communication device 514 corresponds to the wireless communication devices 412, 422 of FIG. 21, and the biological sensor 515 corresponds to the biological sensor 411, 421 of FIG. 21. The CPU 512 controls the wireless communication device 514 and the biological sensor 515. The auxiliary storage device 516 is a device that permanently stores data such as an SSD, a hard disk, etc. The auxiliary storage device 516 stores a program to be executed by the CPU 512. In addition, the auxiliary storage device 516 may store data obtained by the biological sensor 515. The CPU 512 reads the program from the auxiliary storage device 516, develops it in the memory 513, and thus executes it. The memory 513 may be volatile memory such as DRAM, etc., or may be non-volatile memory such as MRAM, etc. The CPU 512 drives the biological sensor 515, stores data obtained by the biological sensor 515 in the memory 513 or the auxiliary storage device 516, and transmits the data to the hub via the wireless communication device 514. The CPU 512 may execute processing associated with communication protocols of layers higher than the MAC layer and processing associated with the application layer.

Figure 23:
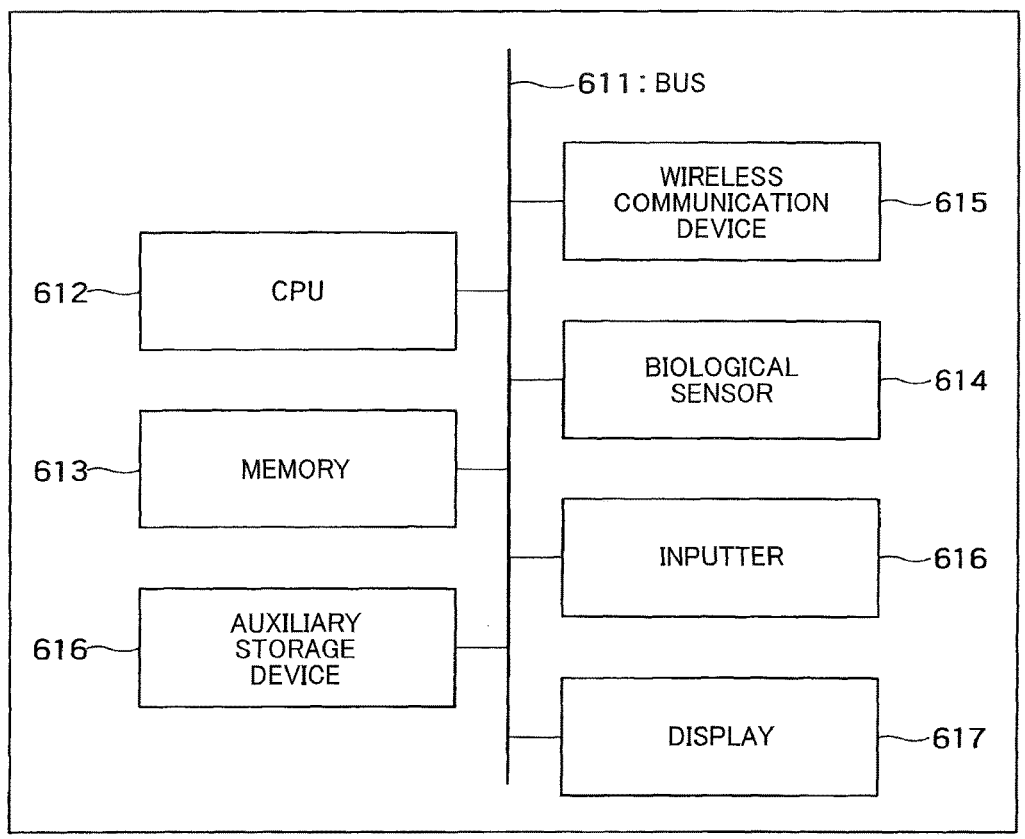
FIG. 23 is a hardware block diagram of a hub according to a nineteenth embodiment.

FIG. 23 is a block diagram that illustrates a hardware configuration of the hub 451 illustrated in FIG. 21. A CPU 612, a memory 613, an auxiliary storage device 616, a communication device 614, a wireless communication device 615, an inputter 616 and a display 617 are connected to a bus 611. Here, the individual units 612 to 617 are connected to one single bus, but a plurality of buses may be provided by a chipset and the individual units 612 to 617 may be connected in a distributed manner to the plurality of buses. A biological sensor or a memory card interface may further be connected to the bus 611. The inputter 616 is configured to receive various instruction inputs from the user and output signals corresponding to the input instructions to the CPU 612. The display 617 provides image display of the data, etc. as instructed by the CPU 612. The communication device 614 and the wireless communication device 615 correspond to the communication device 452 and the wireless communication device 453 provided in the hub of FIG. 21, respectively. The CPU 612 controls the wireless communication device 615 and the communication device 614. The auxiliary storage device 616 is a device that permanently stores data such as an SSD, a hard disk, etc. The auxiliary storage device 616 stores a program executed by the CPU 612 and may store data received from each node. The CPU 612 reads the program from the auxiliary storage device 616, develops it in the memory 613, and executes it. The memory 613 may be volatile memory such as DRAM, etc., or may be non-volatile memory such as MRAM, etc. The CPU 612 stores data received by the wireless communication device 615 from each node in the memory 613 or the auxiliary storage device 616, and transmits the data to the network 471 via the communication device 614. The CPU 612 may execute processing associated with communication protocols of layers higher than the MAC layer and processing associated with the application layer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A wireless device for communication in a first period under a slot allocation-based scheme and in a second period under a contention-based scheme, the first period and the second period included in a beacon interval, comprising:

control circuitry configured to determine a type of a first frame and determine the first period or the second period for a transmission of the first frame; and a transmitter configured to transmit the first frame without carrier-sensing by using one slot in the second period, when the type of the first frame is a first type and when the second period is determined; and perform carrier-sensing during a first time period from a start of the one slot in the second period and transmit the first frame according to a result of the carrier-sensing after first time period has elapsed without detection of a signal, when the type of the first frame is a second type different from the first type and when the second period is determined, wherein the first time period is shorter than a length of the one slot.

2. The device according to claim 1, wherein
the transmitter transmits the first frame at a start timing of the one slot in the second period in a case of not performing the carrier-sensing for transmission of the first frame.

3. The device according to claim 1, wherein
a frame having the first type is an emergency data frame required to transmit preferentially, and a frame having the second type is a frame other than the emergency data frame.

4. The device according to claim 1, wherein
the transmitter performs carrier-sensing during a second time period from the start of the one slot in the second period when a type of first frame is a third type and the second period is determined, the second time period being longer than the first time period and shorter than an interval of one slot, and transmits the first frame according to a result of the carrier-sensing after the second time period has elapsed without detection of a signal.

5. The device according to claim 4, wherein
a frame having the first type is an emergency data frame required to transmit preferentially, a frame having the second type is a control frame or a management frame, and a frame having the third type is a frame other than any one of the emergency data frame, a control frame and a management frame, or a frame having the first type is a control frame or a management frame, a frame having the second type is an emergency data frame required to transmit preferentially, a frame having the third type is a frame other than any one of the emergency data frame, a control frame and a management frame.

6. The device according to claim 1, wherein
the control circuitry determines to transmit the first frame at one slot allocated to another device in the first period,
the transmitter performs carrier sensing during a third time period from a start of the one slot allocated to the other device in the first period when the type of the first frame is the first type, and transmits the first frame according to a result of the carrier-sensing after the third time period has elapsed without detection of a signal,
the transmitter performs carrier-sensing during a fourth time period from the start of the one slot allocated to the other device in the first period when the type of the first frame is the second type, and transmits the first frame according to a result of the carrier-sensing after the fourth time period has elapsed without detection of a signal, and
the third time period is shorter than the fourth time period.

7. The device according to claim 6 wherein
a frame having the first type is an emergency data frame required to transmit preferentially, and a frame having the second type is a frame other than the emergency data frame.

8. The device according to claim 1 wherein
the control circuitry determines to transmit the first frame at one slot allocated to the device-self in the first period and
the transmitter transmits the first frame at a start timing of the one slot.

9. The device according to claim 1, wherein
the control circuitry determines the first access period or the second period and one slot used for transmission of the first frame, according to a timing at which transmission request of the first frame is generated.

10. The device according to claim 1, wherein
the control circuitry determines, according to a time length from a timing at which a transmission request of the first frame is generated to a start timing of a previously allocated slot in the first period, whether to transmit the first frame in the previously allocated slot in the first period.

11. The device according to claim 1, wherein the transmitter transmits the first frame at one slot in the second period at a probability depending on a type of the first frame when the second period is determined.

12. The device according to claim 11, wherein
the probability is one when the first frame is an emergency data frame required to transmit preferentially.

13. The device according to claim 12, wherein
the probability is a value less than one when the first frame is a retransmitted frame of the emergency data frame.

14. The device according to claim 1, wherein
a partner device to communicate with the wireless device is a hub which transmits an announcement signal periodically,
the wireless device is mounted in a node,
the first period and the second period are included in a time period between transmission timings of the announcement signal.

15. The device according to claim 14, wherein
the transmitter transmits capability information to the hub, the capability information indicating that a function of transmitting the first frame at a timing depending on a type of the first frame in the one slot in the second period is set to which of on or off.

16. The device according to claim 1, wherein
the wireless device is mount in a hub which transmits an announcement signal periodically,
a partner device to communicate with the wireless device is a node,
the first access period and the second access period are included in a time interval between transmission timings of the announcement signal.

17. The device according to claim 16,
further comprising a receiver to receive, from a plurality of the nodes, capability information which indicates on or off of a function of transmitting the first frame at a timing defined on a type of the first frame in one slot in the second period,
wherein the control circuitry determines, according to the capability information received from the nodes, on or off of a slot shared function accepting frame transmission based on the function, and
the transmitter transmits information indicating on or off of the slot shared function to the nodes.

18. The device according to claim 1, comprising at least one antenna.

19. A wireless communicating system for communication in a first period under a slot allocation-based scheme and in a second period under a contention-based access scheme of a slot basis, the first period and the second period being included in a beacon interval, the system comprising:
- a first wireless device periodically transmitting an announcement signal and a second wireless device receiving the announcement signal, wherein
- the second wireless device comprises:
- control circuitry configured to determine a type of a first frame and determine the first period or the second period for a transmission of the first frame; and
- a transmitter configured to transmit the first frame without carrier-sensing by using one slot in the second period, when the type of the first frame is a first type and when the second period is determined; and
- perform carrier-sensing during a first time period from a start of the one slot in the second period and transmit the first frame according to a result of the carrier-sensing after first time period has elapsed without detection of a signal, when the type of the first frame is a second type different from the first type and when the second period is determined, wherein the first time period is shorter than a length of the one slot.

20. A wireless communication method for communication in a first period under a slot allocation-based scheme and communication in a second period under a contention-based access scheme of a slot basis, the first period and the second period included in a beacon interval, comprising:
- determining a type of a first frame and determining the first period or the second period for a transmission of the first frame;
- transmitting the first frame without carrier-sensing by using one slot in the second period, when the type of the first frame is a first type and when the second period is determined; and
- performing carrier-sensing during a first time period from a start of the one slot in the second period and transmitting the first frame according to a result of the carrier-sensing after first time period has elapsed without detection of a signal, when the type of the first frame is a second type different from the first type and when the second period is determined, wherein the first time period is shorter than a length of the one slot.

* * * * *